(12) United States Patent
Govindarao et al.

(10) Patent No.: US 10,091,409 B2
(45) Date of Patent: Oct. 2, 2018

(54) IMPROVING FOCUS IN IMAGE AND VIDEO CAPTURE USING DEPTH MAPS

(71) Applicant: NOKIA CORPORATION, Espoo (FI)

(72) Inventors: Krishna Annasagar Govindarao, Bangalore (IN); Soumik Ukil, Bangalore (IN); Ravi Shenoy, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/540,379

(22) PCT Filed: Dec. 2, 2015

(86) PCT No.: PCT/FI2015/050842
§ 371 (c)(1),
(2) Date: Jun. 28, 2017

(87) PCT Pub. No.: WO2016/107962
PCT Pub. Date: Jul. 7, 2016

(65) Prior Publication Data
US 2017/0374269 A1    Dec. 28, 2017

(30) Foreign Application Priority Data
Dec. 30, 2014 (IN) ............................ 6712/CHE/2014

(51) Int. Cl.
*H04N 5/232* (2006.01)
*G02B 7/38* (2006.01)
*H04N 5/222* (2006.01)

(52) U.S. Cl.
CPC ........... *H04N 5/23212* (2013.01); *G02B 7/38* (2013.01); *H04N 5/2228* (2013.01); *H04N 5/23293* (2013.01)

(58) Field of Classification Search
CPC ..... G02B 7/38; H04N 5/2228; H04N 5/23212; H04N 5/23293
See application file for complete search history.

(56) References Cited

U.S. PATENT DOCUMENTS

2007/0152062 A1* 7/2007 He .................... G03B 13/36
235/462.32
2010/0265346 A1* 10/2010 Iizuka ................ G06T 5/50
348/218.1

(Continued)

OTHER PUBLICATIONS

International Search Report and Written Opinion received for corresponding Patent Cooperation Treaty Application No. PCT/FI2015/050842, dated Apr. 29, 2016, 18 pages.

(Continued)

*Primary Examiner* — Amy Hsu
(74) *Attorney, Agent, or Firm* — Nokia Technologies Oy

(57) ABSTRACT

In an example embodiment, method, apparatus and computer program product for improving image and video captures using depth maps of viewfinder depth map, are provided. The method includes facilitating receipt of a viewfinder depth map of a scene, the viewfinder depth map comprising depth information of a plurality of objects in the scene. One or more objects are selected from the plurality of objects based on depth information of the one or more objects in the viewfinder depth map. Two or more images of the scene are facilitated to be captured by at least adjusting focus of a camera corresponding to the depth information of the one or more objects that are selected. In an example, a method also includes facilitating capture of an image of the scene by at least adjusting focus of a camera corresponding to the depth information of the two or more objects that are selected.

15 Claims, 9 Drawing Sheets

(56) References Cited

U.S. PATENT DOCUMENTS

| | | | |
|---|---|---|---|
| 2012/0327179 A1* | 12/2012 | Watson | H04N 5/232 |
| | | | 348/14.08 |
| 2012/0327218 A1 | 12/2012 | Baker et al. | |
| 2013/0044254 A1* | 2/2013 | Tzur | G06T 7/0069 |
| | | | 348/345 |
| 2013/0083180 A1* | 4/2013 | Sasaki | H04N 5/23212 |
| | | | 348/65 |
| 2014/0002693 A1 | 1/2014 | Nestares et al. | |
| 2014/0313362 A1* | 10/2014 | Heringslack | H04N 5/23293 |
| | | | 348/222.1 |

OTHER PUBLICATIONS

Choi, J. et al. '2D-Plus-Depth Based Resolution and Frame-rate Up-conversion Technique for Depth Video.' IEEE Transactions on Consumer Electronics [online], vol. 56, No. 4, pp. 2489-2497, Nov. 2010. Retrieved from the internet<http://ieeexplorer.ieee.org/xpl/articleDetails.jsp?arnumber=5681132>.

Yang, X. et al. 'Depth-Assisted Frame Rate Up-Conversion for Stereoscopic Video.' IEEE Signal Processing letters [online], vol. 21, No. 4, pp. 423-427, Apr. 2014. Retrieved from the Internet: <URL:http://ieeexplore.ieee.org/xpl/articleDetailsjsp?arnumber=6733282>.

\* cited by examiner

IMPROVING FOCUS IN IMAGE AND VIDEO CAPTURE USING DEPTH MAPS

RELATED APPLICATION

This application was originally filed as PCT Application No. PCT/FI2015/050842 filed Dec. 2, 2015, which claims priority benefit from Indian Patent Application No. 6712/CHE/2014, filed Dec. 30, 2014.

TECHNICAL FIELD

Various implementations relate generally to method, apparatus, and computer program product for improving imaging and video capturing.

BACKGROUND

Various electronic devices, for example, mobile phones, and other multimedia devices are widely used for capturing images and videos. Efforts have been made for improving capture of the images and the videos while meeting a plurality of objectives. The plurality of objectives among others include, focusing on desired objects in a scene in a captured image/video, capturing video with continuous autofocus of desired objects, and even capturing quality images/videos in low-light ambient conditions. An example of improving image and video capture includes capturing images at various lens positions of a camera and stacking captured images (also referred to as focal stack capture) to generate a final image or a video. However, such technique have not been able to provide image/video captures in a fast, accurate and efficient manner, and more so such methods have not been able to maintain continuous autofocus in the captured video or burst of images, and good quality of images/videos in low-light ambient conditions.

SUMMARY OF SOME EMBODIMENTS

Various aspects of example embodiments are set out in the claims.

In one embodiment, there is provided a method comprising: facilitating receipt of a viewfinder depth map of a scene, the viewfinder depth map comprising depth information of a plurality of objects in the scene; facilitating selection of one or more objects from the plurality of objects based on depth information of the one or more objects in the viewfinder depth map; and facilitating capture of two or more images of the scene by at least adjusting focus of a camera corresponding to the depth information of the one or more objects that are selected.

In another embodiment, there is provided a method comprising: facilitating receipt of a viewfinder depth map of a scene, the viewfinder depth map comprising depth information of a plurality of objects in the scene; facilitating selection of two or more objects from the plurality of objects based on depth information of the two or more objects in the viewfinder depth map; and facilitating capture of an image of the scene by at least adjusting focus of a camera corresponding to the depth information of the two or more objects that are selected.

In another embodiment, there is provided a method comprising: facilitating receipt of a viewfinder depth map of a scene, the viewfinder depth map comprising depth information of a plurality of image portions in the scene; determining changes in depths of corresponding image portions of the plurality of image portions between a first depth map and a second depth map of the viewfinder depth map; and generating a second image based on a first image by shifting the plurality of image portions of the first image by corresponding changes in depths, wherein a timestamp of capture of the first depth map and the first image is same, and a timestamp of capture of the second depth map and the second image is same.

In another embodiment, there is provided an apparatus comprising at least one processor; and at least one memory comprising computer program code, the at least one memory and the computer program code configured to, with the at least one processor, cause the apparatus to at least perform: facilitate receipt of a viewfinder depth map of a scene, the viewfinder depth map comprising depth information of a plurality of objects in the scene; facilitate selection of one or more objects from the plurality of objects based on depth information of the one or more objects in the viewfinder depth map; and facilitate capture of two or more images of the scene by at least adjusting focus of a camera corresponding to the depth information of the one or more objects that are selected.

In another embodiment, there is provided an apparatus comprising at least one processor; and at least one memory comprising computer program code, the at least one memory and the computer program code configured to, with the at least one processor, cause the apparatus to at least perform: facilitate receipt of a viewfinder depth map of a scene, the viewfinder depth map comprising depth information of a plurality of objects in the scene; facilitate selection of two or more objects from the plurality of objects based on depth information of the two or more objects in the viewfinder depth map; and facilitate capture of an image of the scene by at least adjusting focus of a camera corresponding to the depth information of the two or more objects that are selected.

In another embodiment, there is provided an apparatus comprising at least one processor; and at least one memory comprising computer program code, the at least one memory and the computer program code configured to, with the at least one processor, cause the apparatus to at least perform: facilitate receipt of a viewfinder depth map of a scene, the viewfinder depth map comprising depth information of a plurality of image portions in the scene; determine changes in depths of corresponding image portions of the plurality of image portions between a first depth map and a second depth map of the viewfinder depth map; and generate a second image based on a first image by shifting the plurality of image portions of the first image by corresponding changes in depths, wherein a timestamp of a capture of the first depth map and a capture of the first image is same, and a timestamp of a capture of the second depth map and a capture of the second image is same.

In another embodiment, there is provided a computer program product comprising at least one computer-readable storage medium, the computer-readable storage medium comprising a set of instructions, which, when executed by one or more processors, cause an apparatus to at least perform: facilitating receipt of a viewfinder depth map of a scene, the viewfinder depth map comprising depth information of a plurality of objects in the scene; facilitating selection of one or more objects from the plurality of objects based on depth information of the one or more objects in the viewfinder depth map; and facilitating capture of two or more images of the scene by at least adjusting focus of a camera corresponding to the depth information of the one or more objects that are selected.

In another embodiment, there is provided a computer program product comprising at least one computer-readable storage medium, the computer-readable storage medium comprising a set of instructions, which, when executed by one or more processors, cause an apparatus to at least perform: facilitating receipt of a viewfinder depth map of a scene, the viewfinder depth map comprising depth information of a plurality of objects in the scene; facilitating selection of two or more objects from the plurality of objects based on depth information of the two or more objects in the viewfinder depth map; and facilitating capture of an image of the scene by at least adjusting focus of a camera corresponding to the depth information of the two or more objects that are selected.

In another embodiment, there is provided a computer program product comprising at least one computer-readable storage medium, the computer-readable storage medium comprising a set of instructions, which, when executed by one or more processors, cause an apparatus to at least perform: facilitating receipt of a viewfinder depth map of a scene, the viewfinder depth map comprising depth information of a plurality of image portions in the scene; determining changes in depths of corresponding image portions of the plurality of image portions between a first depth map and a second depth map of the viewfinder depth map; and generating a second image based on a first image by shifting the plurality of image portions of the first image by corresponding changes in depths, wherein a timestamp of capture of the first depth map and the first image is same, and a timestamp of capture of the second depth map and the second image is same.

In another embodiment, there is provided an apparatus comprising: means for facilitating receipt of a viewfinder depth map of a scene, the viewfinder depth map comprising depth information of a plurality of objects in the scene; means for facilitating selection of one or more objects from the plurality of objects based on depth information of the one or more objects in the viewfinder depth map; and means for facilitating capture of two or more images of the scene by at least adjusting focus of a camera corresponding to the depth information of the one or more objects that are selected.

In another embodiment, there is provided an apparatus comprising: means for facilitating receipt of a viewfinder depth map of a scene, the viewfinder depth map comprising depth information of a plurality of objects in the scene; means for facilitating selection of two or more objects from the plurality of objects based on depth information of the two or more objects in the viewfinder depth map; and means for facilitating capture of an image of the scene by at least adjusting focus of a camera corresponding to the depth information of the two or more objects that are selected.

In another embodiment, there is provided an apparatus comprising: means for facilitating receipt of a viewfinder depth map of a scene, the viewfinder depth map comprising depth information of a plurality of image portions in the scene; means for determining changes in depths of corresponding image portions of the plurality of image portions between a first depth map and a second depth map of the viewfinder depth map; and means for generating a second image based on a first image by shifting the plurality of image portions of the first image by corresponding changes in depths, wherein a timestamp of a capture of the first depth map and a capture of the first image is same, and a timestamp of a capture of the second depth map and a capture of the second image is same.

In another embodiment, there is provided a computer program comprising program instructions which when executed by an apparatus, cause the apparatus to: facilitating receipt of a viewfinder depth map of a scene, the viewfinder depth map comprising depth information of a plurality of objects in the scene; facilitating selection of one or more objects from the plurality of objects based on depth information of the one or more objects in the viewfinder depth map; and facilitating capture of two or more images of the scene by at least adjusting focus of a camera corresponding to the depth information of the one or more objects that are selected.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 11 of the drawings.

Figure 1:
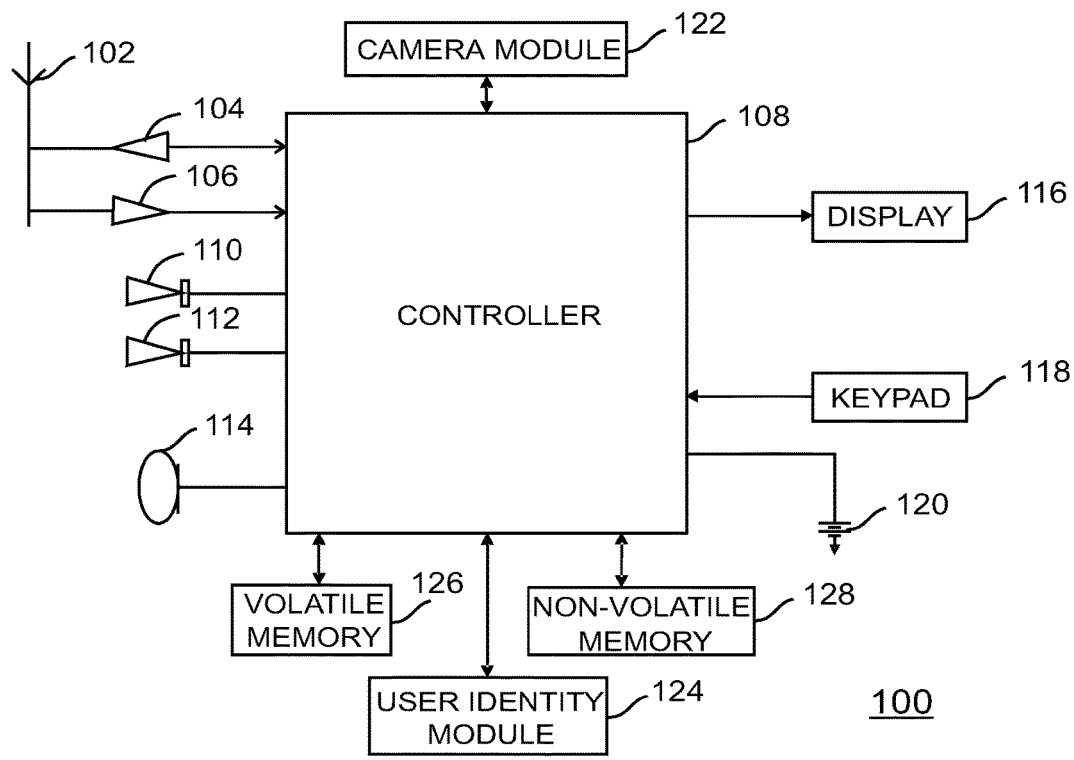
FIG. 1 illustrates a device, in accordance with an example embodiment.

FIG. 1 illustrates a device 100, in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of touch screen based mobile electronic devices, for example, portable digital assistants (PDAs), mobile televisions, gaming devices, cellular phones, all types of computers (for example, laptops, mobile computers or desktops), cameras, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with an air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area networks, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone networks (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional web browser. The connectivity program may then allow the device 100 to transmit and receive web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/ MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
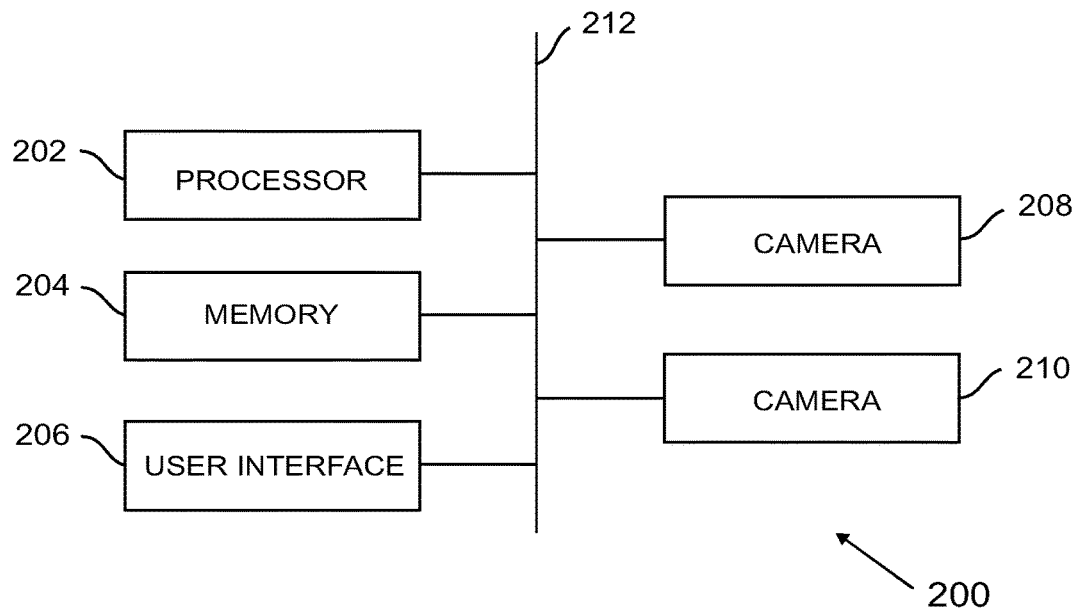
FIG. 2 illustrates an apparatus configured for improving image and video capture, in accordance with an example embodiment.

FIG. 2 illustrates an apparatus 200 configured for improving image and video capture, in accordance with an example embodiment. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, for example, the device 100 or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output interface. The input interface is configured to receive an indication of a user input. The output interface provides an audible, visual, mechanical or other output and/or feedback to the user. Examples of the input interface may include, but are not limited to, a keyboard, a mouse, a joystick, a keypad, a touch screen, soft keys, a microphone, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, multimedia playback device, media capturing device with or without communication capabilities, computing devices, and the like. Some examples of the electronic device may include a mobile phone, audio/video player, a personal digital assistant (PDA), and the like. Some examples of computing device may include a laptop, a personal computer, and the like. In an example embodiment, the electronic device may include a user interface, for example, the user interface 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface 206 of the electronic device. The display and the display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus 200 or circuitry to perform the functions of the transceiver. The transceiver may be configured to receive media content. Examples of the media content may include audio content, video content, data, and a combination thereof.

In an example embodiment, the electronic device may be optionally embodied as to include image sensors embodies in one or more cameras, for example, cameras 208 and 210. The camera 208 and 210 are in communication with the processor 202 and/or other components of the apparatus 200. The cameras 208 and 210 in communication with processor 202 and other imaging circuitries and/or softwares, are configured to capture digital images or to capture video or other graphic media. The cameras 208 and 210 may be examples of at least one camera module such as the camera module 122 of the device 100. In an example embodiment, at least one of the cameras 208 and 210 may be a time-of-flight camera. In another example, at least one of the cameras 208 and 210 may be a depth camera, for example a stereo camera, a plenoptic camera or a light-field camera, or a camera that is configured to generate a depth map on streaming viewfinder frames. The depth map generated on the streaming viewfinder frames (e.g., live streamed frames of the scene on a viewfinder) are hereinafter also referred to as a 'viewfinder depth map' for the purposes of the description.

These components (202-210) may communicate to each other via a centralized circuit system 212 to facilitate improvement of image and video captures in the apparatus 200. The centralized circuit system 212 may be various devices configured to, among other things, provide or enable communication between the components (202-210) of the apparatus 200. In certain embodiments, the centralized circuit system 212 may be a central printed circuit board (PCB) such as a motherboard, main board, system board, or logic board. The centralized circuit system 212 may also, or alternatively, include other printed circuit assemblies (PCAs) or communication channel media.

In an example embodiment, terms 'focus position' and 'lens position' are used interchangeably in the present disclosure as per the context. As such, the 'focus position' and the 'lens position' represent a position of a lens of a camera such that while capturing an image in this position of the lens, at least one desired object of a scene is in focus.

Further, terms 'disparity' and 'depth' of any pixel or any image portion (of one or more objects of the scene) are also used interchangeably in the present disclosure, and as such it should be understood that the 'disparity' is inversely proportional to the 'depth', and the 'disparity' can be determined from the 'depth', and vice versa. The terms 'disparity map' and 'depth map' are also used interchangeably throughout the present disclosure. Further, terms 'image frame' and 'image frames' of a video have also been used interchangeably in place of 'video frame' and 'video frames' of the video, respectively.

In an example embodiment, the apparatus 200 is caused to perform improvement of image and video captures. In this example embodiment, the processor 202 is configured to, with the content of the memory 204, and optionally with other components described herein, to cause the apparatus 200 to facilitate receipt of a viewfinder depth map of a scene. In an example embodiment, the viewfinder depth map includes depth information of a plurality of objects in the scene. Herein, the 'scene' refers to an arrangement (natural, manmade, sorted or assorted) of one or more objects of which images and/or videos can be captured. Herein, the "viewfinder depth map" represents one or more depth maps that are generated based on field of view of the scene that is continuously being viewed and simultaneously displayed by a viewfinder of a camera (for example, the camera 208 or 210) of the apparatus 200. The viewfinder depth map may be generated by one or more cameras, for example by a depth camera or a stereo camera that may be examples of the cameras 208 and/or 210. In an example, the viewfinder depth map can also be an image including depth (or disparity) information of the objects in the scene. In some example embodiments, the viewfinder depth map may be stored in the apparatus 200. In an example embodiment, a processing means may be configured to facilitate receipt of the viewfinder depth map. An example of the processing means may include the processor 202, which may be an example of the controller 108.

It should be understood that as 'brightness information' of the scene can be analyzed in form of a histogram of image intensities, similarly the viewfinder depth map can also be received in form of a disparity histogram or a depth histogram. Herein, the 'disparity histogram' refers to a visualization of disparities or depths in the scene based on a distribution of pixels over perceived disparity levels (or depth values) associated with the plurality of objects of the scene. For instance, in an example of a disparity histogram, height of each histogram column (or vertical bar) represents a number of pixels at a perceived disparity level (or depth value).

In some example embodiments, the processor 202 is configured to facilitate selection of one or more objects from the plurality of objects based on the viewfinder depth map. In some example embodiments, each of the one or more objects is located at a corresponding depth that can be determined by the viewfinder depth map. In an example embodiment, the one or more objects of interest may be selected based on the disparity histogram associated with the viewfinder depth map. In an example, the one or more objects may be selected from the plurality of objects on the basis of their sizes in the viewfinder depth map. For instance, objects greater than a threshold percentage of image size in the viewfinder depth map may be selected. In an example embodiment, the one or more objects having sizes greater than the threshold percentage of image size may be selected based on analyzing peaks of various disparities in the disparity histogram. In an example embodiment, an object in the scene is generally associated with a depth value and a number of pixels for the depth value is an indicator of the size of the object. In an example, as the depth of the object is already known from the viewfinder depth map (for example, the disparity histogram), a focus position (or a lens position) of a camera can be determined such that if an image is captured by setting the focus of the camera at the focus position, the object is in focus in the captured image. Accordingly, the corresponding depth of the object may be used to compute or determine the focus position at which lens of the camera is to be focused for capturing the object in focus in the captured image. In an example embodiment, a number of objects that are greater than the threshold percentage of image sizes can be determined based on the disparity histogram, and further, their depth value and corresponding focus positions for capturing the objects in focus can also be determined. In such a manner, number of images to be captured may be determined based on a number of objects that need to be focused in a final image. In an example embodiment, a processing means may be configured to facilitate selection of the one or more objects. An example of the processing means may include the processor 202, which may be an example of the controller 108.

In another example embodiment, the number of images to be captured may be determined based on a face detection method if the one or more objects represent people in the scene. In order to avoid capturing faces in a background of the scene, a threshold value on a minimum face size may be considered. In another example embodiment, the number of images to be captured may be determined based on touch input provided by a user of the apparatus 200, in which the touch may indicate the one or more objects the user desires the lens of the apparatus 200 to focus upon.

In some example embodiments, the processor 202 is configured to facilitate capture of two or more images of the scene by at least adjusting focus of a camera of the apparatus 200 corresponding to depth information of the one or more objects that are selected. Herein, the 'two or more images' refer to a burst of images, or a series of images that can form a video. In an example embodiment, the focus of the camera may be adjusted by using statistics of the viewfinder depth map to augment a plurality of statistics generated by a statistics engine for improving quality of the two or more images. An example of the statistics engine can be the processor 202. For example, the processor 202 is configured to perform the functionalities of the statistics engine, for example, adjusting the focus (determining the focus position of lens of the camera) of the camera of the apparatus 200. In an example embodiment, a processing means may be configured to facilitate capture of the two or more images. An example of the processing means may include the processor 202, which may be an example of the controller 108.

In an example embodiment of facilitating capture of the two or more images, the apparatus 200 is caused to capture the two or more images by adjusting the focus of the camera. In an example embodiment, an individual image of the two or more images is captured by setting the focus of the camera at a respective focus position corresponding to depth information of an individual object of the one or more objects. In an example embodiment, the two or more images are captured based on a burst capture or a focal stack capture of the camera. In a typical conventional application, a focal stack capture includes spanning an entire range of possible focus (lens) positions from macro to infinity and capturing an image at each lens position or a uniformly sampled subset of lens positions. However, in an example embodiment of the present disclosure, adjusting the focus does not include setting the focus of the camera at all available focus positions. For example, the focal stack capture in the present disclosure includes capturing only a few images based on the number of selected objects, where each image is captured by adjusting the focus of the camera based on respective focus positions determined for each selected object. Hence, the number of images that are captured (or the number of different lens positions) is equal to the number of objects that are selected from the plurality of objects.

In an example, if objects O1, O2 and O3 of the scene are selected based on respective sizes being greater than a threshold size in the disparity histogram, their corresponding depth values D1, D2 and D3, respectively, are also determined. In this example, the apparatus 200 is caused to capture three image I1, I2 and I3, where the image I1 is captured by setting the focus of the camera (at a focus position F1) based on the depth value D1, the image I2 is captured by setting the focus of the camera (at a focus position F2) based on the depth value D2 and the image I3 is captured by setting the focus of the camera (at a focus position F3) based on the depth value D3. In an example embodiment, a processing means may be configured to capture the two or more images by adjusting the focus (e.g., adjusting the lens position of the camera) of the camera. An example of the processing means may include the processor 202, which may be an example of the controller 108.

In an example embodiment of facilitating capture of the two or more images, the apparatus 200 is further caused to combine the two or more images to generate an image. For instance, if the camera captures three images I1, I2 and I3 by setting the focus of the camera to three focus positions F1, F2 and F3 corresponding to the objects O1, O2 and O3, respectively, the three images I1, I2 and I3 can be combined to generate an image I. In an example, each of the objects O1, O2 and O3 is in focus in the image I. In an example embodiment, a processing means may be configured to combine the two or more images to generate the image I. An example of the processing means may include the processor 202, which may be an example of the controller 108.

Various methods may be employed to select the one or more objects (for example, O1, O2 and O3) by the apparatus 200. In an example embodiment, for facilitating selection of the one or more objects from the plurality of objects, the apparatus 200 is caused to select objects greater than a threshold percentage of image size in the viewfinder depth map. In an example embodiment, the objects may be selected based on analyzing the disparity histogram to determine significant peaks. For instance, a peak may be determined as a significant peak if number of pixels is greater than a threshold percentage, for example 5% or 10%, of pixels (or the image size) in the image. In an example embodiment, the significant peaks may be determined automatically once the threshold percentage is set. In an example embodiment, the objects corresponding to the threshold percentage of the image size are thereby selected. In an example embodiment, if number of images that can be captured or processed in the focal stack capture or the burst capture is fixed at 3, then three most significant peaks may be picked from the disparity histogram. In yet another example embodiment, if the number of images that can be captured or processed in the focal stack capture or the burst capture is fixed as 5, then five most significant peaks may be picked from the disparity histogram. If number of significant peaks is less than the number of images that is usually captured, then the number of images captured can be made equal to the number of significant peaks in the disparity histogram (even if the apparatus 200 commonly captures 3 or 5 images in the focal stack capture or the burst capture). In an example embodiment, a processing means may be configured to select objects greater than the threshold percentage of the image size. An example of the processing means may include the processor 202, which may be an example of the controller 108.

In an example embodiment, the two or more images constitutes a video, and for generating the video, the apparatus 200 is caused to generate the video where the one or more objects are in continuous autofocus in different image frames of the video. Herein, the 'continuous autofocus' refers to a mode of the camera in which one or more objects in the scene may be continuously focused upon against a changing background (the one or more objects are moving).

In an example embodiment of performing the continuous autofocus in the video, the apparatus 200 is caused to determine changes in depths (or disparities) of the one or more objects between depth maps (or disparity maps) obtained from the viewfinder depth map, for example, between a first depth map (or first disparity map) and a second depth map (or second disparity map) of the viewfinder depth map. In an example, the second depth map (or the second disparity map) is received chronologically later than the first depth map (or the first disparity map). For instance, an object in the scene is in motion and a first image frame is captured by keeping the focus of the camera at a first focus position f1 based on position of the object in the first depth map at a time instance t(n). In this example, the first depth map may be received prior to a time of capture of the first image frame of the video, for example a time instance t(n−1). The object in the first disparity map may have a disparity D1 and the object in the second disparity map may have a disparity D2. Hence, the change in disparity of the object between the first disparity map and the second disparity map in the viewfinder depth map is a difference between the disparities D2 and D1. In an example embodiment, a processing means may be configured to determine the change in depth (or disparity) of at least one object. An example of the processing means may include the processor 202, which may be an example of the controller 108.

In an example embodiment of performing the continuous autofocus, the apparatus 200 is caused to determine changes in focus positions of the one or more objects based on the change in corresponding disparities of the one or more objects. In an example embodiment, the first image frame is captured at the time instance t(n) by setting the focus of the camera at the first focus position f1 based on the depth map (or disparity map) received at the time instance t(n−1). In an example embodiment, a second focus position f2 is determined based on the disparity D2 of the object, where the disparity D2 is obtained from the second depth map (or the second disparity map) received at the time instance t(n). The change in focus positions of the object from f1 to f2 between two captures is thereby determined based on the change in disparity D1 to D2 and using one or more other image statistics. In an example embodiment, a processing means may be configured to determine the change in the focus position of the at least one object. An example of the processing means may include the processor 202, which may be an example of the controller 108.

In an example embodiment, for performing the continuous autofocus, the apparatus 200 is caused to adjust the focus of the camera based on the determined focus position, for example the second focus position f2, to capture an image frame, for example a second image frame, of the video. In an example embodiment, the second image frame is captured at a time instance t(n+1). In an example embodiment, a viewfinder frame rate of receipt of the viewfinder depth map is greater than a video frame rate of capture of the video and the second depth map is received prior (for example at the time instance t(n)) to a time of capture of the second image frame of the video. In an example embodiment, a processing means may be configured to adjust the focus of the camera based on the determined focus position. An example of the processing means may include the processor 202, which may be an example of the controller 108.

In another example embodiment of the present disclosure, the apparatus 200 is caused to receive the viewfinder depth map of the scene, facilitate selection of the two or more objects based on depth information of the two or more objects in the viewfinder depth map, and facilitate capture of an image where the two or more objects are in focus. In this example embodiment of facilitating capture of the image including the two or more objects in focus, the apparatus 200 is caused to select the two or more objects, for example, a first object and a second object in the scene. In an example, the first object is at a first depth in the viewfinder depth map and the second object is at a second depth in the viewfinder depth map. In an example embodiment, the first and second objects may be selected based on the threshold percentage of the image size, the face detection method, or the touch input provided by the user. In an example embodiment, a processing means may be configured to select a first object and a second object. An example of the processing means may include the processor 202, which may be an example of the controller 108.

In an example embodiment of facilitating capture of the image including the two or more objects in focus, the apparatus 200 is caused to determine a focus position of the camera to suitably focus the first object and the second object in one capture of the scene. In an example embodiment, the focus position is determined based on the first depth and the second depth. For instance, in an example embodiment, the focus position is determined by selecting a depth at a midpoint between the first depth and the second depth. For instance, if disparity value of the first depth related to the first object is 220 and disparity value of the second depth related to the second object is 160, a disparity value of the depth at the midpoint may be calculated as (220+160)/2=190. Hence, to suitably focus the first object and the second object in one capture of the scene, the focus position of the camera is to be set based on the disparity value of 190. For instance, the focus position may be determined using the disparity value of 190 with or without using one or more image statistics needed for the calculation of the focus position. In an example embodiment, a processing means may be configured to select the midpoint between the first depth and the second depth. An example of the processing means may include the processor 202, which may be an example of the controller 108. This example embodiment is further described with reference to FIGS. 5A-5B.

In another example embodiment of facilitating capture of the image including the two or more objects in focus, the focus position is determined by selecting a weighted combination for the first depth and the second depth. For instance, if disparity value of the first depth related to the first object is 220 and disparity value of the second depth related to the second object is 160, a weightage of 70% may be given to the first depth as the first object is nearer to the camera as determined by the depth value 220 and a weightage of 30% may be given to the second depth.

Hence, to suitably focus the first object and the second object in one capture of the scene, the focus position of the camera is determined by selecting the depth based on the weighted combination of 70% and 30% for the first depth and the second depth, respectively. In an example embodiment, a processing means may be configured to select the depth based on the weighted combination for the first depth and the second depth. An example of the processing means may include the processor 202, which may be an example of the controller 108. This example embodiment is further described with reference to FIGS. 5A-5B.

In another example embodiment of the present disclosure, the viewfinder depth map is also used to generate image frames for a video. For instance, the apparatus 200 is caused to facilitate receipt of the viewfinder depth map of a scene by a camera, and the apparatus 200 is also caused to facilitate receipt of image frames of a video of the scene. In these example embodiments, the frame rate of the viewfinder depth map is greater than a frame rate of acquisition of the video. The apparatus 200 is caused to generate one or more image frames of the video based on the viewfinder depth map, so as to enhance frame rate of the video. Such embodiments may specifically be useful, apart from other scenarios, in low ambient light conditions, where frame rate of capture of the video is limited by the light present in the scene. In such scenarios, using a camera, such as a time of flight camera, the viewfinder depth map is obtained at a higher frame rate, and additional image frames for the video are generated based on depth maps obtained from the viewfinder depth map and available image frames of the captured video.

In an example embodiment of generation of image frames of the video, the processor 202 is configured to, with the content of the memory 204, and optionally with other components described herein, to cause the apparatus 200 to facilitate receipt of a viewfinder depth map of a scene. In an example embodiment, the viewfinder depth map includes depth information of a plurality of image portions in the scene. In an example embodiment, each image portion of the plurality of image portions may represent a pixel or a patch of pixels. In an example embodiment, a processing means may be configured to facilitate receipt of the viewfinder depth map of the scene. An example of the processing means may include the processor 202, which may be an example of the controller 108.

In an example embodiment of the generation of image frames of the video, the processor 202 is configured to determine changes in depths (or disparities) of corresponding image portions of the plurality of image portions between a first depth map and a second depth map of the viewfinder depth map. Herein, the change in depths (or disparities) between the first depth map and the second depth map correspond to motion of the corresponding image portion between the first depth map and the second depth map. In an example embodiment, the first depth map corresponds to a first image (or first image frame) of a video. In an example embodiment, the first depth map and the second depth map may be received at consecutive time instances, for example t1 and t2, or at different time instances. In this example embodiment, a viewfinder frame rate of receipt of the viewfinder depth map is greater than a video frame rate of capture of the video. In an example embodiment, the changes in disparities for the corresponding image portions are determined to compute movement of each pixel or each patch of pixels of the corresponding image portions from the first depth map (or the first disparity map) to the second depth map (or the second disparity map).

In an example embodiment, a processing means may be configured to determine changes in depths (or disparities) of the corresponding image portions of the plurality of image portions between the first depth map and the second depth map of the viewfinder depth map. An example of the processing means may include the processor 202, which may be an example of the controller 108.

In an example embodiment of the generation of image frames of the video, the processor 202 is configured to generate a second image based on the first image by shifting the plurality of image portions of the first image by corresponding changes in disparities, where the changes in the disparities are obtained based on the first depth map (or the first disparity map) and the second depth map (or the first disparity map). In an example embodiment, a timestamp of capture of the first depth map and a capture of the first image is same, and a timestamp of capture of the second depth map and a capture of the second image is same. As the viewfinder frame rate of receipt of the viewfinder depth map is greater than the video frame rate of capture of the video, the second depth map is received prior to a time of capture of the image frame (e.g., the second video frame) of the video. By shifting (forward shifting) the image portions of the first image based on the corresponding changes in disparities as determined from the first depth map and the second depth map, the second image may be generated. In an example embodiment, such a process may be termed as a forward prediction as the first image is used for generating the second image. In an example embodiment, a processing means may be configured to generate the second image based on the first image. An example of the processing means may include the processor 202, which may be an example of the controller 108. This example embodiment is further described with reference to FIG. 6.

In another example embodiment of generation of image frames of the video, the processor 202 is configured to generate the second image based on the second depth map, a third depth map and a third image (or a third video frame of the video); where the timestamp of capture of the third depth map and a capture of the third image are same, and are captured chronologically later than the second depth map. Such generation of the second image based on the third image, the second map and third depth map may be termed as a backward prediction. In this example embodiment, the processor 202 is configured to generate the second image based on the third image by shifting the plurality of image portions of the third image by corresponding changes in disparities, where the changes in the disparities are obtained based on the second depth map (or the second disparity map) and the third depth map (or the third disparity map). Herein, the change in depths (or disparities) between the third depth map and the second depth map correspond to motion of the corresponding image portion between the second depth map and the third depth map. As the viewfinder frame rate of receipt of the viewfinder depth map is greater than the video frame rate of capture of the video, the second depth map is available even if a corresponding image frame (for example, the second image) is not available in the video while acquisition of the video. By shifting (backward shifting) the image portions of the third image based on the corresponding changes in disparities as determined from the second depth map and the third depth map, the second image may be generated. In an example embodiment, this process may be termed as the backward prediction as the third image is used for generating the second image. In an example embodiment, a processing means may be configured to generate the second image based on the third image. An example of the processing means may include the processor 202, which may be an example of the controller 108. This example embodiment is further described with reference to FIG. 6.

In another example embodiment of generation of image frames of the video, a combination of the forward prediction and the backward prediction may also be used to generate the second image. In some example embodiments, the processor 202 is configured to determine changes in depths (or disparities) of corresponding image portions of the plurality of image portions between the first depth map, the second depth map and the third depth map of the viewfinder depth map. In an example embodiment, the first depth map corresponds to the first image and the third depth map corresponds to the third image of the video. In an example embodiment, the first depth map, the second depth map and the third depth map may be received at consecutive time instances or timestamps (based on capture instances of the viewfinder depth map), for example at t1, t2 and t3. In this example embodiment, the viewfinder frame rate of receipt of the viewfinder depth map is greater than the video frame rate of capture of the video. In an example embodiment, the changes in disparities for the corresponding image portions may be determined so as to represent movement at each pixel or each patch of pixels from the first depth map to the second depth map and the third depth map to the second depth map. In an example embodiment, a processing means may be configured to determine changes in depths (or disparities) of corresponding image portions of the plurality of image portions between the first depth map, the second depth map and the third depth map of the viewfinder depth map. An example of the processing means may include the processor 202, which may be an example of the controller 108.

In some example embodiments, the processor 202 is configured to generate the second image based on the first image and the third image by shifting the plurality of image portions of the first image and the third image by the corresponding changes in disparities. For example, by shifting (forward shifting and backward shifting, or by shifting based on an average of forward shifting and backward shifting) the image portions of the first image and the third image based on the corresponding changes in disparities as determined from the first depth map, the second depth map and the third depth map, the second image may be generated.

Additionally or alternatively, the second image may be generated based on estimating optical flow between depth maps of the viewfinder depth map. Since the first depth map, the second depth map and the third depth map are available at a higher temporal rate than video data, the optical flow of such depth maps may be estimated. Herein, 'the optical flow' may refer to a distribution of velocities or motion of objects in an image and estimation of the optical flow between video frames, velocities or motion of the objects in the video may be measured. One such method of estimation of optical flow is set forth in Andrey Krylov et al., "Fast super-resolution from video data using optical flow estimation" in *International Conference on Signal Processing Proceedings—ICSP*, 2008. The optical flow estimated from the viewfinder of the camera capturing the video can be used to further upsample the video. It should be understood that the optical flow utilized to generate image frames of the video in an example embodiment of the present disclosure is advantageous as compared to conventional techniques that use the optical flow to upsample the video data. For instance, in the present disclosure, the temporal rate of the depth maps is already higher than the frame rate of video capture. For example, if the video frame rate of capture of the video is 30 fps and viewfinder frame rate of receipt of the viewfinder depth map is 60 fps, then to upsample the video to 60 fps, interpolation of the optical flow need not be performed. If the video frame rate higher than the viewfinder frame rate is required, proposed system is still advantageous since degree of upsampling needed will be lower (compared to the upsampling from the optical flow of the video alone, which is at a lower rate). In an example embodiment, a processing means may be configured to generate the second image based on the first image and the third image. An example of the processing means may include the processor 202, which may be an example of the controller 108.

It should be understood that at least one of the "optical flow estimation" and "pixel correspondences between depth maps (for example, between the first and second depth maps)" may be used for generating additional or missing frames of the video, for example, generating the second image. For instance, in one implantation, if the video needs to be upsampled above the viewfinder frame rate, the optical flow estimation may be used, otherwise the pixel correspondences between the depth maps may be used to generate the second image. However, in another implementation, the optical flow estimation may be used irrespective of frames rate of the video capture, the viewfinder frame rate and desired frame rate of an upsampled video.

Various suitable techniques may be used to improve imaging and video capture by the apparatus 200. Some example embodiments of improvement of imaging and video captures are explained in the following description; however, these example embodiments should not be considered as limiting to the scope of the present technology.

An example of facilitating capture of an image where one or more objects are in focus is described with reference to FIGS. 3A to 3C.

Figure 3A:
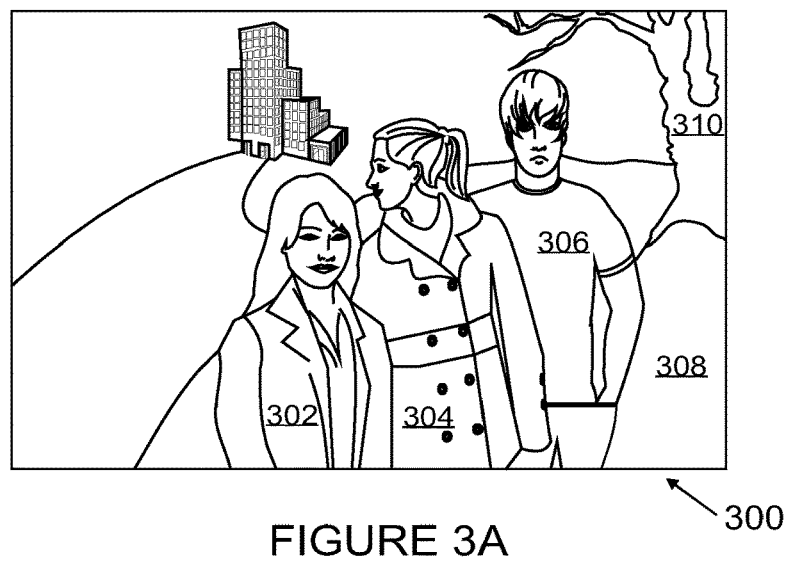
FIG. 3A illustrates an example representation of a scene, in accordance with an example embodiment.

FIG. 3A illustrates an example representation of a scene 300, in accordance with an example embodiment. In this example representation, the scene 300 may be captured by an image sensor, for example the image sensor embodied in the camera 208 and/or the camera 210, in the apparatus 200. The scene 300 includes objects in a foreground and a background of the scene 300, respectively. For example, the foreground includes a lady 302, a lady 304, a man 306, shrubs 308, and a tree trunk 310, and the background includes a building and roads. The objects in the foreground and the background of the scene 300 are at different depths. It should be noted that the objects nearest to the apparatus 200 or camera may have higher disparity values as compared to the objects farther to the camera. For instance, the lady 302 in the foreground is at a highest disparity as compared to the building in the background.

Figure 3B:
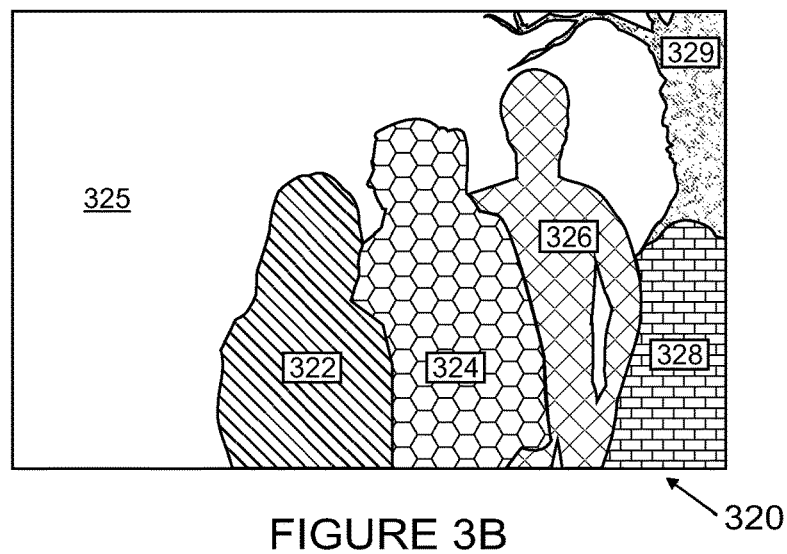
FIG. 3B illustrates an example representation of a viewfinder depth map of the scene, in accordance with an example embodiment.

FIG. 3B illustrates an example representation of a viewfinder depth (or disparity) map 320 of the scene 300, in accordance with an example embodiment. The viewfinder depth map 320 provides depth information of each pixel in the scene 300 and may be obtained by initially capturing a pair of images, for example stereo images, of the scene 300. It should be noted that the viewfinder depth map 320 is shown for representation purposes only; and such representation does not necessarily represent an accurate depth map associated with the scene 300, respectively, but to facilitate description of some example embodiments only. In an example embodiment, the viewfinder depth map 320 is generated by performing different methods, for example cost aggregation or a tree-based aggregation. As illustrated in FIG. 3B, the viewfinder depth map 320 or the disparity map of the scene 300 illustrates depth for objects in the foreground of the scene 300, for example a region 322 representing depth for the lady 302, a region 324 representing depth for the lady 304, a region 326 representing depth for the man 306, a region 328 representing depth for the shrubs 308, and a region 329 representing depth for the tree trunk 310 of FIG. 3A with different patterns to indicate varying depths or disparity levels. The viewfinder depth map 320 further represents the objects in the background with a single pattern (see, 325) as such objects in the background may not be of significance to the user.

Figure 3C:
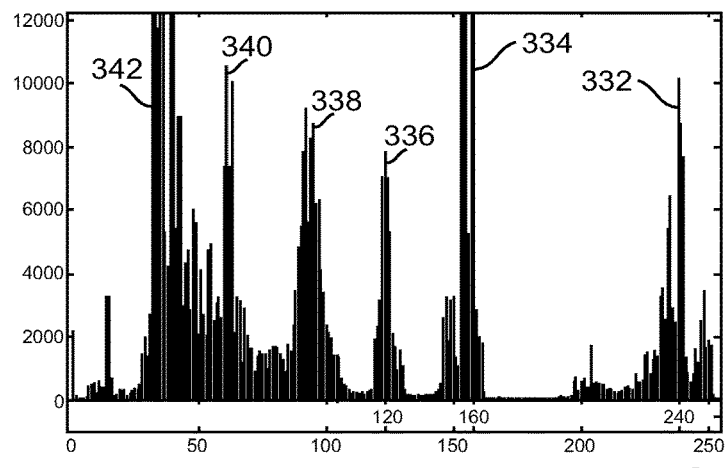
FIG. 3C illustrates an example representation of a disparity histogram of the scene, in accordance with an example embodiment.

FIG. 3C illustrates an example representation of a disparity histogram 330 of the scene 300, in accordance with an example embodiment. Herein, the 'disparity histogram' refers to a graphical representation of distribution of disparity values. It should be noted that the disparity histogram 330 is shown for representation purposes only to facilitate description of some example embodiments; and such representation does not necessarily represent an accurate disparity histogram associated with the scene 300. In this example representation, the depth information of the viewfinder depth map 320 may be represented using the disparity histogram 330. In the example representation of the disparity histogram 330, an X-axis represents the disparity values (inversely proportional to depth) from 0 to 250, where a disparity value 0 represents an object at a farthest depth from the camera and a disparity value 250 represents an object at a closest depth from the camera. Further, Y-axis represents number of pixels occupied by objects at corresponding disparity values. In this example representation, height of a vertical bar along the Y-axis represents a size of an object at a corresponding disparity (or depth) in the scene 300. So, based on the heights of the vertical bars, sizes of different objects at corresponding disparity values may be determined. In this representation, a vertical bar 332 represent the lady 302, a vertical bar 334 represent the lady 304, a vertical bar 336 represent the man 306, a vertical bar 338 represent the shrubs 308, a vertical bar 340 represent the tree trunk 310, and a vertical bar 342 represents the background of the scene 300.

From analyzing the disparity histogram 330, the apparatus 200 may select the objects that need to be focused upon based on some of the peaks (of vertical bars) in the disparity histogram 330. For instance, the apparatus 200 may select the lady 302, the lady 304 and the man 306 of the scene 300 as objects of interest. In one instance, an object may be labeled as significant if the object is a foreground object and is greater than a threshold percentage of image size, for example the object occupies more than 5% or 10% of pixels in the scene 300. In an example embodiment, the vertical bar 332 corresponds to the lady 302 occupying 10000 pixels at a disparity value 240, the vertical bar 334 corresponds to the lady 304 occupying 12000 pixels at a disparity value 160, and the vertical bar 336 corresponds to the man 306 occupying 8000 pixels at a disparity value 120 are selected, and other vertical bars located at disparity values smaller than 100 are ignored. Based on the vertical bars 332, 334, and 336, the apparatus 200 determines that depth values corresponding to the disparity values 240, 160 and 120, need to be in focus, and may be taken into account for adjusting focus positions for capturing the three images in the focal stack capture or the burst capture, respectively. Hence, in an example embodiment of the present disclosure, instead of capturing an image for each focus position (or lens position) from macro to infinity or sampling entire range of the focus positions uniformly and combining all such images to generate an image that is well focused, only three images are captured and combined to generate the image I, in which the three objects the lady 302, the lady 304 and the man 306 are focused.

In another example embodiment, the number of images that needs to be captured is determined based on a face detection method. In an example embodiment, a threshold value on a minimum face size is considered in order to avoid capturing faces in the background of the scene 300. For instance, in an example, if face sizes of the lady 302, the lady 304, and the man 306 are above the threshold size, three images are determined for being captured by keeping the focus on the lady 302, the lady 304 and the man 306, respectively, in the three images. In this example, if a person is present in the background of the scene 300, and his face size is smaller than the threshold value, the person may not be determined for being captured. In another example embodiment, the number of images to be captured may be determined based on a touch input provided by a user of the apparatus 200, in which the touch may indicate the one or more objects the user desires the lens of the apparatus 200 to focus upon. For instance, the user may touch areas on the display screen of the apparatus 200 that correspond to the lady 302, the lady 304, and the man 306 such that focus positions corresponding to only such selected objects are taken into consideration when performing the focal stack capture or the burst capture.

An example of facilitating capture of a video or a burst of images where one or more objects are in continuous autofocus is described with reference to FIG. 4.

Figure 4:
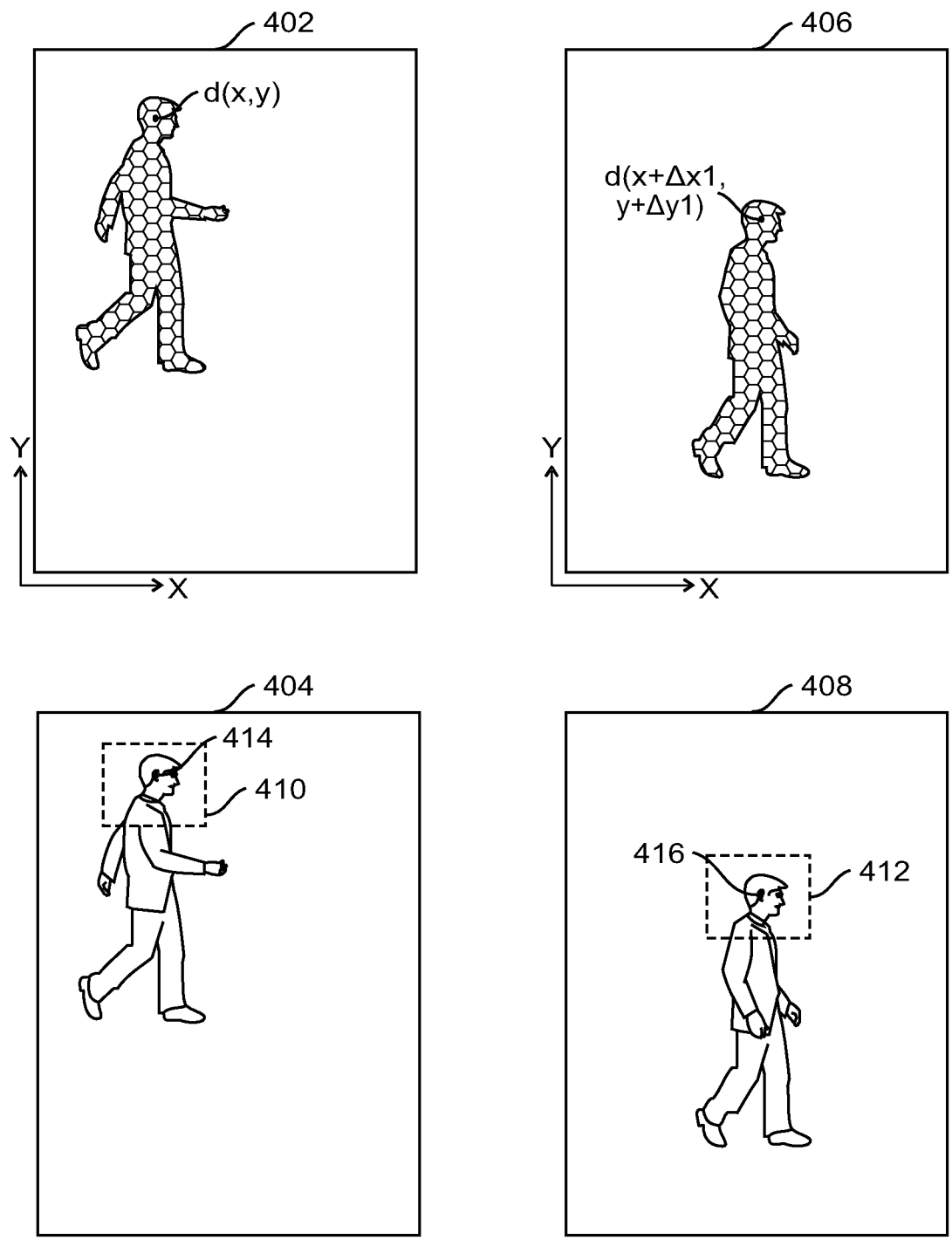
FIG. 4 illustrates example representations for performing continuous autofocus in video or a burst of images, in accordance with an example embodiment.

FIG. 4 illustrates example representations for performing continuous autofocus in video (or a burst of images), in accordance with an example embodiment. The example representations include a first depth map 402, a first image frame 404, a second depth map 406 and a second image frame 408. It should be noted that the first depth map 402 and the second depth map 406 of a viewfinder depth map are shown for representation purposes only to facilitate description of some example embodiments; and such representations does not necessarily represent accuracy of the depth maps. It should be noted that the first image frame 404 and the second image frame 408 are images or image frames of the video (or the burst of images).

In an example embodiment, a viewfinder frame rate of receipt of the viewfinder depth map is greater than a video frame rate of capture of the video. For instance, the viewfinder frame rate is 60 frames per second (fps) and the video frame rate is 30 fps. In an example embodiment, the viewfinder depth map can be captured by a time of flight camera (ToF) camera, or a faster stereo camera at a faster frame rate as compared to a camera for acquiring video frames. In an example embodiment, a time stamp of capture of the first depth map 402 and a time stamp of a capture of the first image frame 404 of the video are same, and due to faster capturing of the viewfinder depth map, the second depth map 406 is received prior to time of capture of the second image frame 408 of the video.

The first depth map 402 illustrates depth information of an object, for example a man in motion, and the first image frame 404 illustrates an image of the man in motion. It should be noted that the second depth map 406 is received chronologically later than the first depth map 402 but prior to a time of capture of the second image frame 408 of the video. In this example embodiment, the apparatus 200 is caused to use the changes in depth information of one or more objects between the first depth map 402 and the second depth map 406, to decide upon focus positions for the one or more objects in the second image frame 408, where the second image frame 408 is yet to be captured. In order to explain the continuous autofocus in the video, a pixel 414 (a pixel belonging to face of the man) is taken as an example. A depth value d(x,y) is the depth information of the pixel 414 in the first depth map 402. As illustrated in the first depth map 402 and the second depth map 406, there is a movement of the man and the pixel 414 which previously was represented by the depth value d(x,y) in the first depth map 402 is now represented by a shifted depth value d(x+Δx1, y+Δy1). A change in depth of the pixel 414 between the first depth map 402 and the second depth map 406 is determined by a difference between the depth value d(x+Δx1, y+Δy1) and the depth value d(x,y). In an example, from the change in depth of the pixel 414 (or by determining change in depths of more pixels such as the pixel 414), a change in focus position of the object (the man) may be determined. For example, if focus position of the man in the first image frame 404 is F (see, 410), from the change in depth it may be determined that the focus position has changed to F' (see, 412). Focus of the camera is now adjusted based on the determined focus position F' to capture the second image frame 408 of the video. If, however, there is no change in depth of the pixel 414, there is no need to search for focus in a next frame. As illustrated in the second image frame 408, the pixel 416 is now in focus (see, 412) based on the shifted depth value d(x+Δx1, y+Δy1). In this manner, any object may be in continuous autofocus, as the depth maps from the viewfinder depth map are already available even before the capture of image frames (or video frames) of the video. Thus, focus for a current video frame is not based on previous video frames, or on a depth map associated with a previous video frame. Instead, the focus for the current video frame is based on a depth map that is acquired after the previous video frame, and before the current video frame, and which may be considered as a current depth map.

In an example embodiment, an object (for example, the man) may be selected for the continuous autofocus if the object is greater than a threshold percentage of image size in the viewfinder depth map. In an example embodiment, the viewfinder depth map may be received as the disparity histogram, as block averages, or as an edge map. In an example embodiment, the object may be selected based on analyzing the disparity histogram, performing face detection or by a user providing touch input.

An example of facilitating capture of an image having a focus at one or more objects is described with reference to FIGS. 5A and 5B.

Figure 5A:
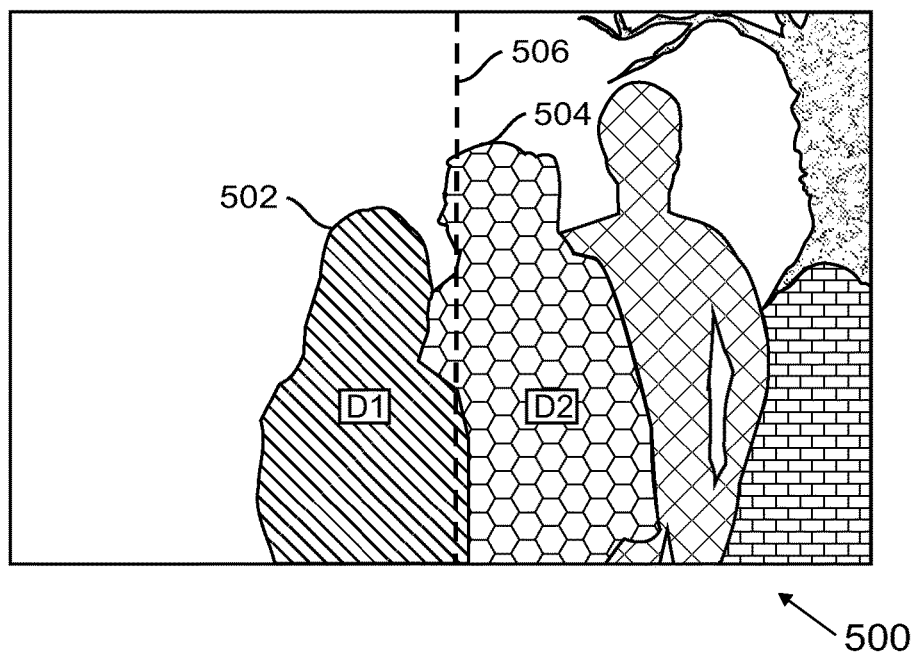
FIG. 5A illustrates an example representation of a viewfinder depth map of a scene, in accordance with an example embodiment.
Figure 5B:
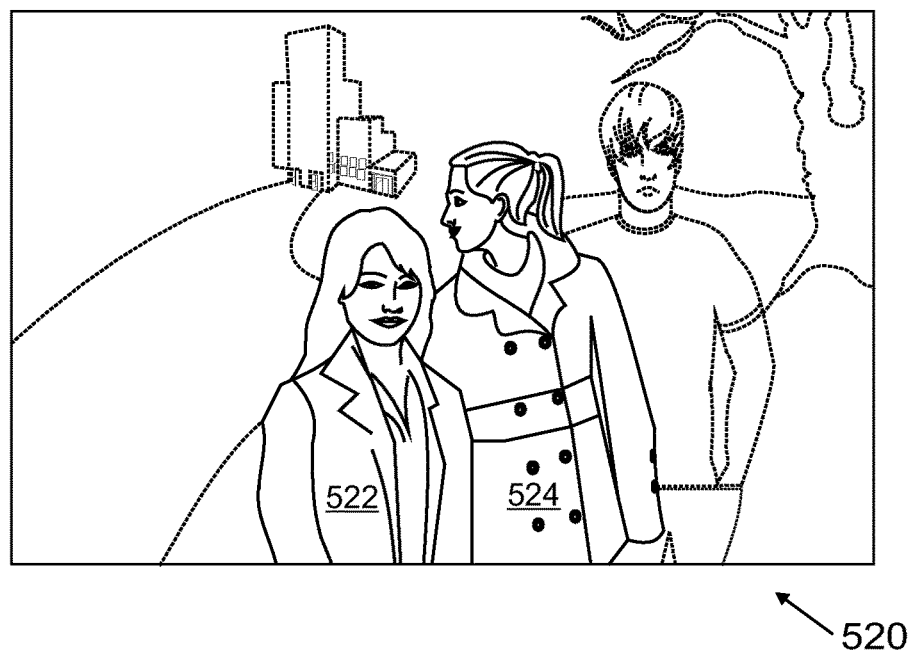
FIG. 5B is illustrates an example representation of a captured image, in accordance with an example embodiment.

FIG. 5A illustrates an example representation of a viewfinder depth map 500 of a scene, for example the scene 300, in accordance with an example embodiment. It should be noted that the viewfinder depth map 500 is shown for representation purposes only and does not necessarily represent an accurate depth map associated with the scene. As illustrated in FIG. 5A, the viewfinder depth map 500 or the disparity map of the scene illustrates the objects in the foreground of the scene, for example a lady 502, and a lady 504 of the scene, with different patterns to indicate varying depths or disparity levels. The viewfinder depth map 500 further represents the objects in the background with a single pattern for the representative purposes.

In some scenarios, it may be required to facilitate capture of an image with focus on a limited number of objects of the scene, for example the lady 502 and the lady 504. It should be noted that as such, there is no limitation on the number of objects to be focused in the image, even though the two objects are focused in the following example. In an example embodiment, for capturing such an image, a focus position of the camera needs to be determined such that depths corresponding to the two objects are in acceptable focus (as defined by the user). In an example, the two objects are selected, for instance the lady 502 is selected as a first object associated with a first depth (D1) and the lady 504 is selected as a second object associated with a second depth (D2). In an example embodiment, the viewfinder depth map 500 is received as the disparity histogram and the two objects are selected based on analyzing the disparity histogram. Alternatively or additionally, face detection can be employed to select the objects. Additionally or alternatively, a user provided touch input can also be used to select the objects. For instance, the user or any automated or semi-automated means can provide inputs to select the objects in the viewfinder depth map 500. The focus position of the camera that suitably focuses the first object and the second object in one capture of the scene is determined based on the depths (or disparities) of the selected objects in the viewfinder depth map 500.

In an example embodiment, the focus position is determined by selecting a depth at midpoint (see, a line 506) between the first depth D1 and the second depth D2, for example, at a depth D, where D is equal or approximately equal to (D1+D2)/2. The depth at the midpoint is further used to determine the focus position of the camera of the apparatus 200, and the image is captured (in a single capture) by setting the focus of the camera at the determined focus position. The captured image is shown in FIG. 5B. As illustrated in FIG. 5B, a captured image 520 is focused at the lady 502 (see, 522) and the lady 504 (see, 524) as desired and rest of the captured image 520 may be out of focus. In an example embodiment, the focus position may be determined by selecting a weighted combination for the first depth D1 and the second depth D2. For example, more weightage, for example 70%, may be given to the lady 502 and a less weightage, for example 30%, may be given to the lady 504. In this example embodiment, the focus position of the camera of the apparatus 200 is determined, where the focus position is between the depths of the ladies 502 and 504, but the depth position is closer to the depth of the lady 502 as compared to the depth of the lady 504. Further, in a single capture, the captured image 520 is obtained that has a higher focus on the lady 502 as compared to the lady 504.

In an example embodiment, if a sharpness of the lady 502 and the lady 504 in the captured image 520 is less than a threshold sharpness, the apparatus 200 is caused to capture two images separately by focusing the lady 502 and the lady 504, respectively, and combining the two images to generate an image having both the ladies 502 and 504 in focus. For instance, in scenarios of the sharpness of the lady 502 and the lady 504 being below the threshold sharpness in the captured image 520, the image may be automatically captured by the focal stack capture or the burst capture of two images, as described in FIGS. 3A-3C. For instance, individual images are captured by setting the focus of the camera at respective focus positions corresponding to depth information of individual objects of the one or more objects, and individual images may be combined to generate a final image. In an example embodiment, the focal stack capture can be automatically set and can be performed if it is determined from the captured image (captured based on determining the focus position) that any of the first object and the second object is blurred or out-of-focus (determined based on the threshold sharpness).

In another example embodiment, if the sharpness of the first object and the second object in the captured image 520 is below the threshold sharpness, the apparatus 200 is caused to decrease a mechanical aperture of the camera to increase a depth of field to facilitate capture of the image. Herein, the 'mechanical aperture' of the camera refers to a hole or opening that allows light to enter. Herein, the 'depth of field' refers to a distance between nearest and farthest objects in the scene that appear acceptably sharp in an image. In an example embodiment, sufficient light is required for decreasing the mechanical aperture of the camera to increase the depth of field to facilitate capture of the image. In an example embodiment, exposure time has to be increased when the mechanical aperture of the camera is decreased. In an example embodiment, if the aperture is set to a widest measurement a shallow depth of field is generated. In an example embodiment, if there is low light and decreasing the mechanical aperture in the low light increases the exposure time above a threshold exposure time to cause motion blur or handshake, the image may be captured automatically using the focal stack capture instead of decreasing the mechanical aperture. In an example embodiment, a processing means may be configured to decrease the mechanical aperture of the camera to increase the depth of field to facilitate capture of the image. An example of the processing means may include the processor 202, which may be an example of the controller 108.

An example of generation of image frames of a video (or images as part of a burst of images) using a viewfinder depth map is described with reference to FIG. 6.

Figure 6:
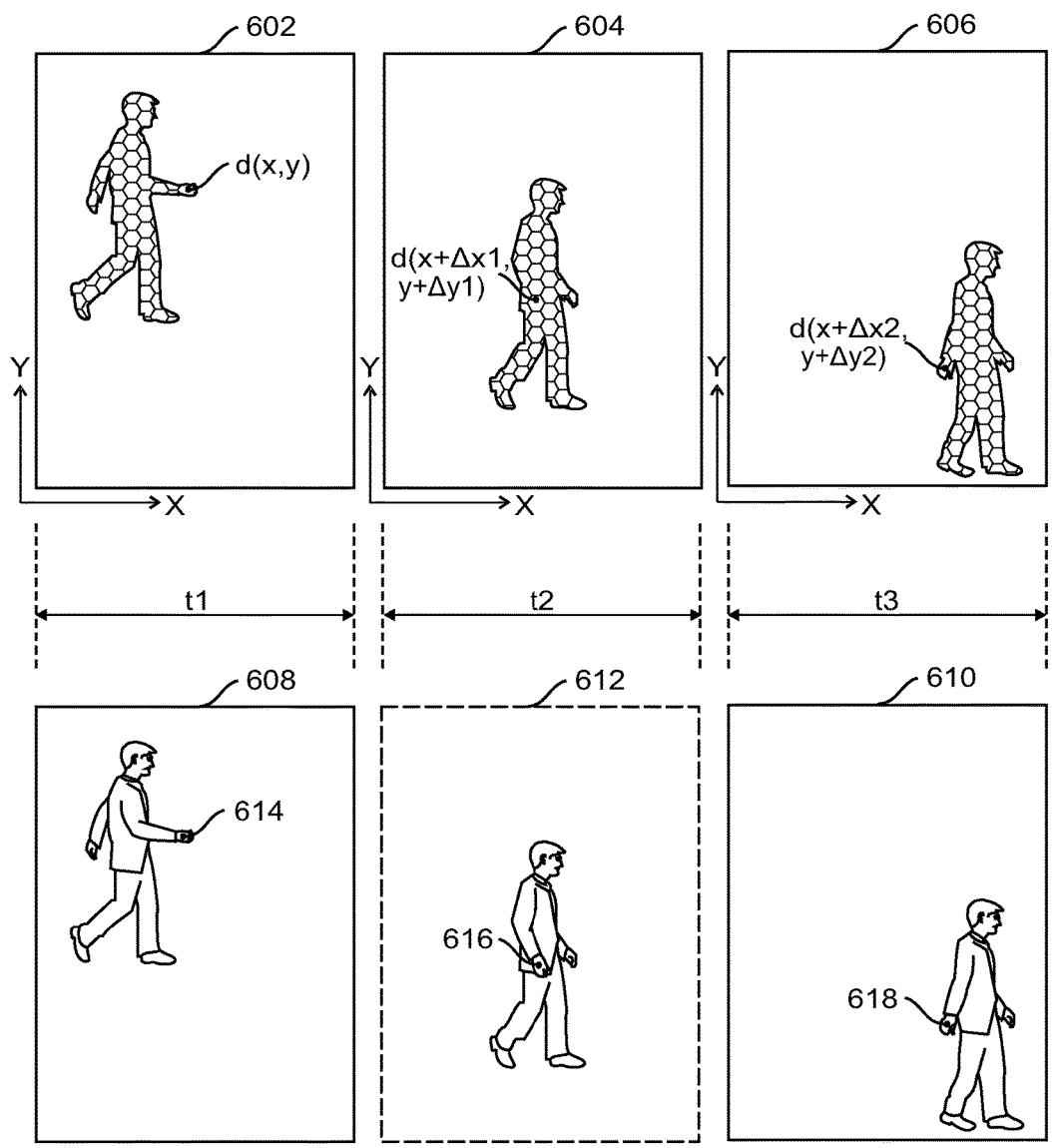
FIG. 6 illustrates example representations for improving video capture, for example increasing a video frame rate of the video, in accordance with an example embodiment.

FIG. 6 illustrates example representations for improving video capture, in accordance with an example embodiment. In this example embodiment, the video capture is improved by increasing video frame rate based on the viewfinder depth map. In an example embodiment, a first camera in the apparatus 200, for example, the time of flight camera captures the viewfinder depth map of a scene, and a second camera in the apparatus 200 is used for capturing the video of the scene. In such example of the apparatus 200, the frame rate of the viewfinder depth map (captured by the first camera) is more as compared to image frames of the video (captured by the second camera).

In an example, the viewfinder depth map is a continuous stream of depth maps of the scene, and at any given point of time, a frame of the viewfinder depth map is a depth map. Some of the depth maps obtained from the viewfinder depth map are shown in FIG. 6, for example, a first depth map 602, a second depth map 604 and a third depth map 606. In an example embodiment, a viewfinder frame rate of receipt of the viewfinder depth map is greater than a video frame rate of capture of the video. For instance, the viewfinder frame rate is determined as 60 frames per second (fps) and the video frame rate is determined as 30 fps. The viewfinder depth map includes depth information of a plurality of image portions of the scene, where the image portions may be a pixel or a patch of pixels. In this example, between time instances of t1 to t3, three frames of the viewfinder depth map is received, whereas only two images or two image frames of the video are captured due to difference in frame rates of the viewfinder depth map and the acquisition of the video. For instance, the first depth map 602 and the first image frame 608 may have the same timestamp t1, and the third depth map 606 and the third image frame 610 may have the same timestamp t3. At the timestamp t2, there is no image frame available, whereas the second depth map 604 is available.

In an example embodiment, the first depth map 602, the second depth map 604 and the first image frame 608 are used to generate the second image frame 612 and such a process is termed as a forward prediction to generate the second image frame 612. The first depth map 602 and the second depth map 604 illustrate depth information of an image portion (for example, a man), and based on the changes in depths (or disparities) of the image portion in both the depth maps, a relative shift of the image portion between the depth maps 602 and 604 is determined. As the second depth map 604 is received (at a timestamp t2) chronologically later than the first depth map 602 (at a timestamp t1), the shifts (changes) in depths of image portions (for example, pixels or patch of pixels) are obtained based on difference of corresponding image portions in the depth maps 602 and 604.

In the example representation shown in FIG. 6, a pixel (see, 614) on a right hand of the man has a depth value d(x,y) in the first depth map 602, and the depth value d(x,y) corresponds to d(x+Δx1, y+Δy1) in the second depth map 604. In an example embodiment, the pixel correspondences between the first depth map 602 and the second depth map 604 may be obtained, and such pixel correspondences can be used to generate the second image frame 612. In another example, pixel correspondences may be obtained by based on the sequence of depth maps, for example the first depth map 602, the second depth map 604 and the third depth map 606, and such pixel correspondences can be used to generate the second image frame 612.

Alternatively, or additionally, pixel correspondences may be obtained by using optical flow techniques on a sequence of depth maps, for example the first depth map 602, the second depth map 604 and the third depth map 606. The computation of the optical flow is described with reference to FIG. 2. Computing the optical flow between the depth maps 602 and 604 provide information of motion or velocity of each pixel in the first depth map 602 captured at t1 with respect to the second depth map 604 captured at t2. At t1, the first image frame 608 is acquired, while at t2 there is no corresponding image frame. An objective is to obtain image data corresponding to the second image frame 612 at t2 using the optical flow information computed from the depth maps 602 and 604. It has to be noted that a warp or a transformation may be needed of the depth maps 602 and/or 604 so that the depth maps 602 and/or 604 have the same view as the image frames captured by the camera. In the first image frame 608, by computing the optical flow or pixel movement for every pixel (e.g., Δxi, Δyj) an estimated second image frame 612 is generated. This is termed forward prediction since only processing is causal, meaning only data from previous time stamps are used for predicting a current image or video frame.

In another embodiment, the optical flow can be computed between the depth maps 604 and 606. The third image frame 610 is available at t3 and thereby the optical flow may be computed between the depth maps 604 and 606 to estimate the second image frame 612 of the video that is missing. This is termed as backward prediction since the processing is anti-causal, meaning information is used from an image or video frame that is ahead of the current time stamp. In another embodiment, a weighted combination of the forward prediction and the backward prediction may be used.

In an example embodiment, the optical flow may be computed using depth maps of the viewfinder depth map and information of image for those time stamps where both are available. The optical flow thus computed can be used to upsample the image information to achieve a higher temporal rate of the video. In another example embodiment, the optical flow may be computed using the depth maps and information of the image jointly, using the depth information at time stamps where depth is available, and using both image and depth information at the time stamps where both are available. Such optical flow can be used to further upsample the image information to achieve a higher temporal rate of the video.

Figure 7:
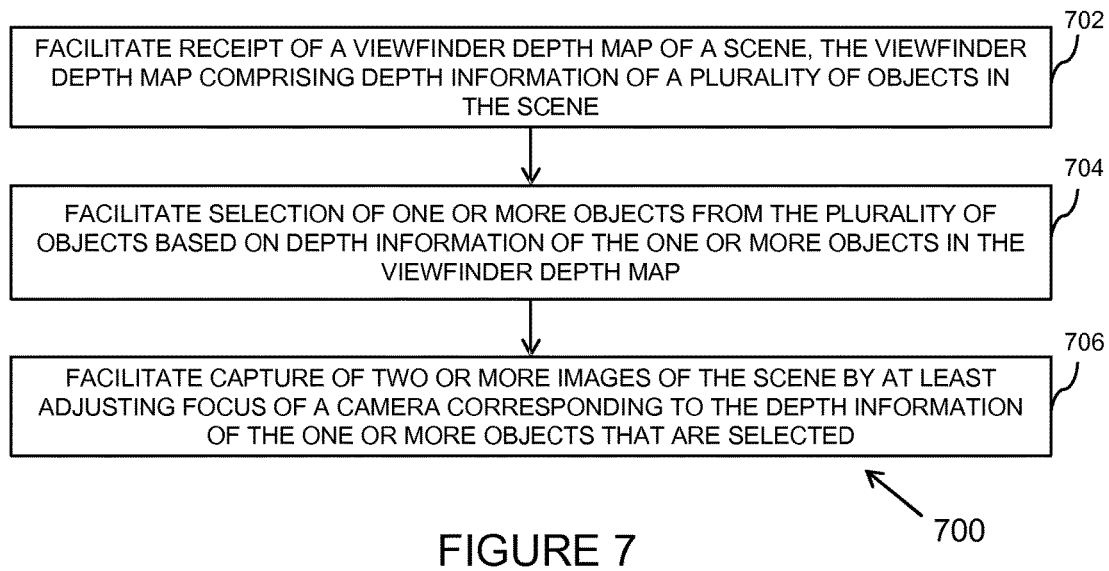
FIG. 7 is a flowchart depicting an example method for improving image capture, in accordance with an example embodiment.

FIG. 7 is a flowchart depicting an example method 700 for improving image capture, in accordance with an example embodiment. The method 700 is shown and explained with reference to FIG. 2. The method 700 depicted in the flowchart may be executed by, for example, the apparatus 200 of FIG. 2.

At 702, the method 700 includes facilitating receipt of a viewfinder depth map, for example the viewfinder depth map 320 of FIG. 3B, of a scene, for example the scene 300. In an example embodiment, the viewfinder depth map includes depth information of a plurality of objects in the scene. In an example embodiment, the viewfinder depth map may be received by an apparatus, for example the apparatus 200, as a disparity histogram, for example the disparity histogram 330, as block averages, or as an edge map.

At 704, the method 700 includes facilitating selection of one or more objects from the plurality of objects based on depth information of the one or more objects in the viewfinder depth map. In an example embodiment, the objects are selected if the objects are greater than a threshold percentage of image size in the viewfinder depth map, as described with reference to FIG. 2. At 706, the method 700 includes facilitating capture of two or more images of the scene by at least adjusting focus of a camera corresponding to the depth information of the one or more objects that are selected. The two or more images may be captured as described with reference to FIG. 2.

Some example embodiments of improving image and video captures are further explained with reference to FIGS. 8 to 11.

Figure 8:
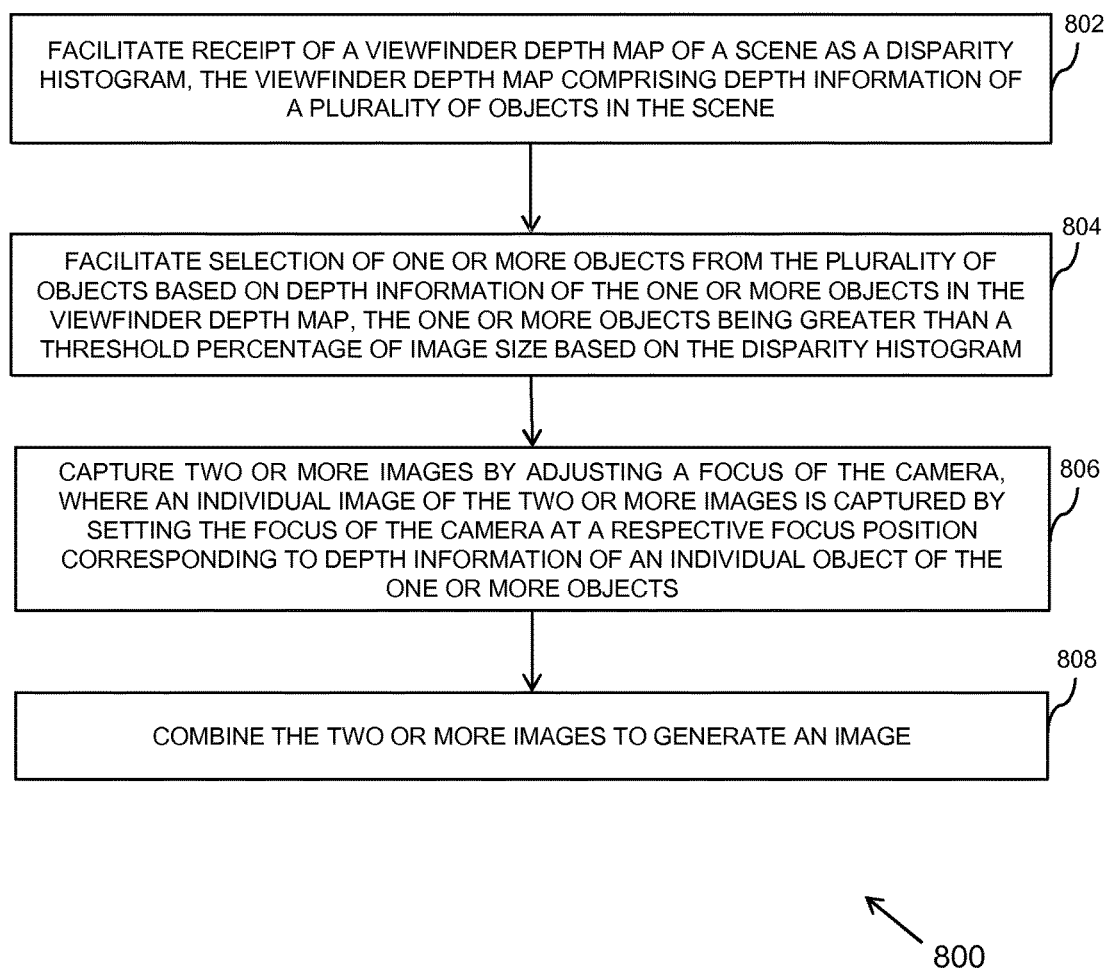
FIG. 8 is a flowchart depicting an example method for improving image capture, in accordance with another example embodiment.

FIG. 8 is a flowchart depicting an example method 800 for improving image capture, in accordance with another example embodiment. The method 800 is shown and explained with reference to FIG. 2. The method 800 depicted in the flowchart may be executed by, for example, the apparatus 200 of FIG. 2.

At 802, the method 800 includes facilitating receipt of a viewfinder depth map of a scene as a disparity histogram. In an example embodiment, the viewfinder depth map includes depth information of a plurality of objects in the scene. In an example embodiment, the viewfinder depth map may be received by an apparatus, for example the apparatus 200, as a disparity histogram, for example the disparity histogram 330, as block averages, or as an edge map.

At 804, the method 800 includes facilitating selection of one or more objects from the plurality of objects based on depth information of the one or more objects in the viewfinder depth map. In an example embodiment, the one or more objects that are greater than a threshold percentage of image size in the viewfinder depth map are selected. The selection of the one or more objects is as described with reference to FIG. 3B and FIG. 3C.

At 806, the method 800 includes capturing two or more images of the scene. At 806, the method 800 includes capturing two or more images by adjusting the focus of the camera, where an individual image of the two or more images is captured by setting the focus of the camera at a respective focus position (or lens position) obtained based on depth information of an individual object of the two or more objects. In an example embodiment, the focus of the camera is adjusted (e.g., respective focus positions are determined) based on statistics of the viewfinder depth map in addition to a plurality of statistics (e.g., aperture, focal length, lens type, depth of field, sharpness, type of sensors, etc.) generated by a statistics engine. At 808, the method 800 includes combining the two or more images to generate the at least one image. In an example, the operations at block 806 and 808 together perform the focal stack capture or burst capture of only the selected objects, thereby keeping the number of images to be stacked to a minimum. The focal stack capture is as described with reference to FIGS. 3A-3C.

An example embodiment of improving video functions is described with reference to FIG. 9.

Figure 9:
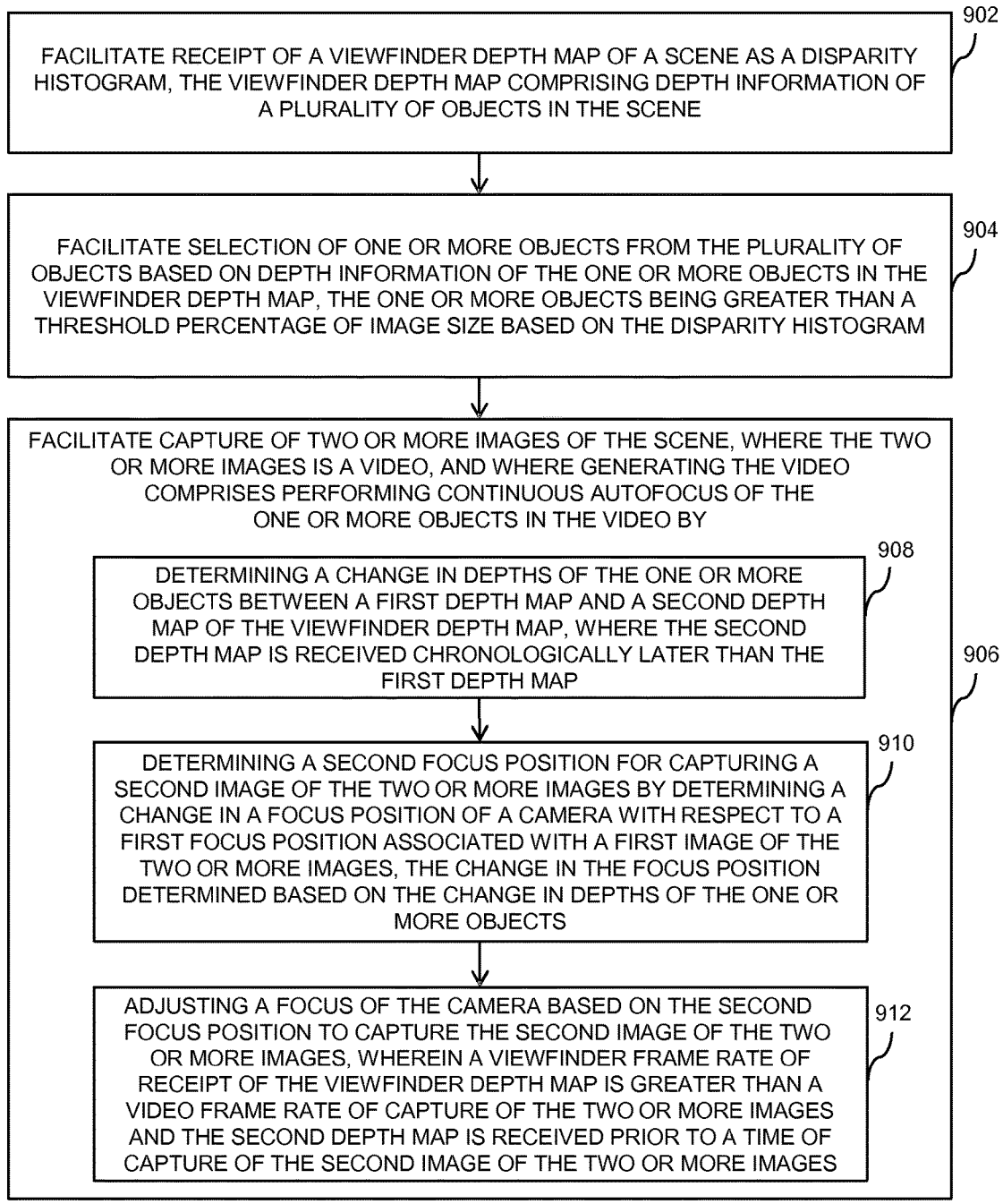
FIG. 9 is a flowchart depicting an example method for improving video capture, in accordance with an example embodiment.

FIG. 9 is a flowchart depicting an example method 900 for improving video capture, in accordance with an example embodiment. The method 900 is shown and explained with reference to FIG. 2. The method 900 depicted in the flowchart may be executed by, for example, the apparatus 200 of FIG. 2.

At 902, the method 900 includes facilitating receipt of a viewfinder depth map of a scene as a disparity histogram. In an example, the viewfinder depth map may be in form of a disparity histogram including disparity (or depth) information of a plurality of objects in the scene. An example of the disparity histogram can be the disparity histogram 330.

At 904, the method 900 includes facilitating selection of one or more objects from the plurality of objects based on depth information of the one or more objects in the viewfinder depth map. In an example embodiment, the one or more objects are greater than a threshold percentage of image size in the viewfinder depth map. The selection of the one or more objects is as described with reference to FIG. 3B and FIG. 3C.

At 906, the method 900 includes facilitating capture of two or more images of the scene. In an example embodiment, the two or more images for a video, or a burst of images. In an example embodiment, generating the video includes performing continuous autofocus of the one or more objects in the two or more images that form the video or the burst of images. In an example embodiment, the operation of performing the continuous autofocus at the block 906 includes operations of the blocks 908, 910 and 912.

At 908, the method 900 includes determining a change in depths of the one or more objects between a first depth map and a second depth map of the viewfinder depth map. The second depth map is received chronologically later than the first depth map.

At 910, the method 900 includes determining a second focus position for capturing a second image of the two or more images by determining a change in a focus position of the camera with respect to a first focus position associated with a first image of the two or more images. In an example embodiment, the change in the focus position is determined based on the change in disparities (or depths) of the one or more objects that is already determined at block 908.

At 912, the method 900 includes adjusting the focus of the camera based on the second focus position to capture the second image of the two or more images (e.g., of the video). It is to be noted that a viewfinder frame rate of receipt of the viewfinder depth map is greater than a video frame rate of capture of the two or more image (i.e., the video) and the second depth map is received prior to a time of capture of the image frame of the video. The continuous autofocus is described in detail with reference to FIG. 4.

Figure 10:
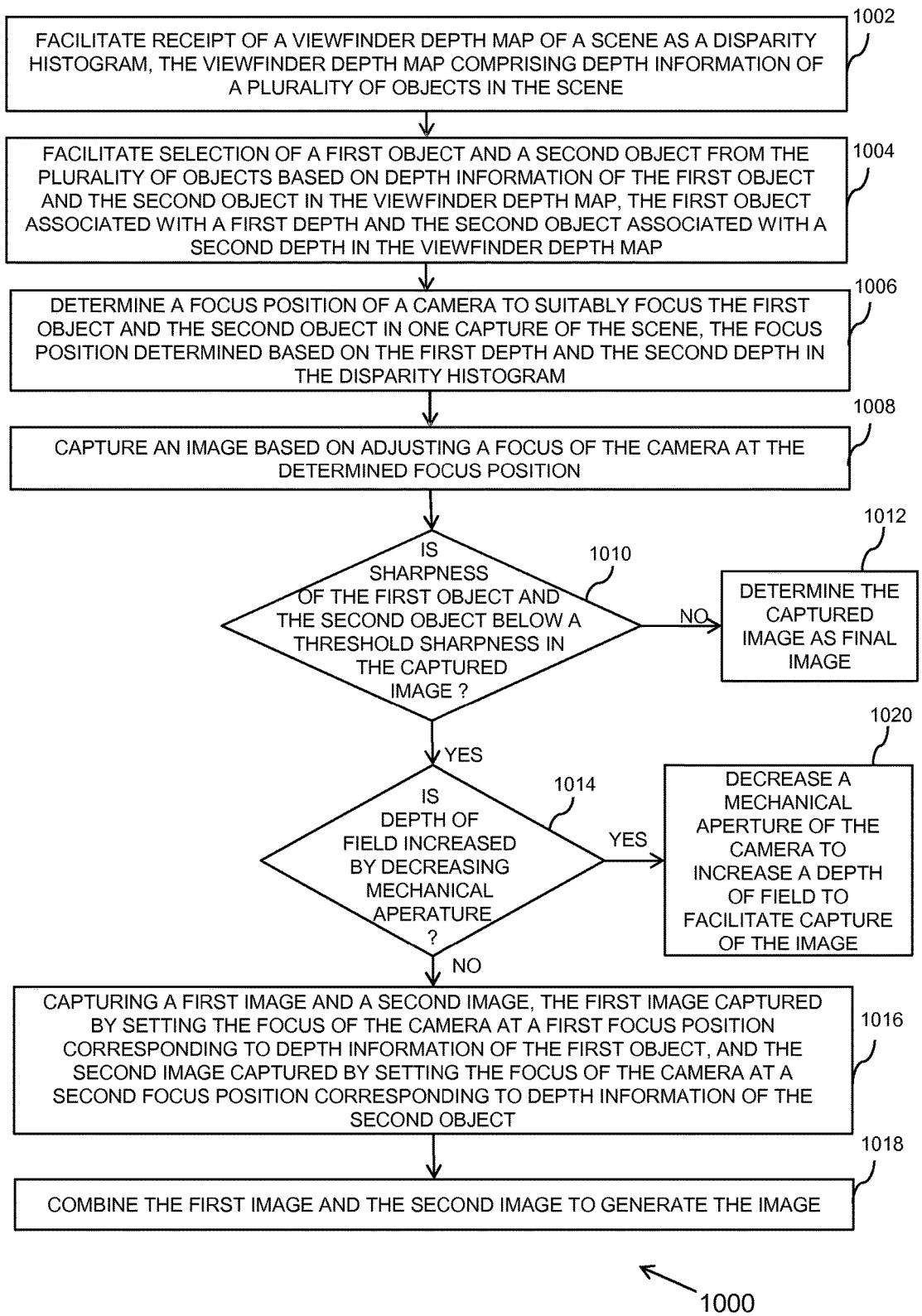
FIG. 10 is a flowchart depicting an example method for improving image capture, in accordance with yet another example embodiment.

FIG. 10 is a flowchart depicting an example method 1000 for improving image capture, in accordance with another example embodiment. The method 1000 is shown and explained with reference to FIG. 2. The method 1000 depicted in the flowchart may be executed by, for example, the apparatus 200 of FIG. 2.

At 1002, the method 1000 includes facilitating receipt of a viewfinder depth map of a scene as a disparity histogram. In an example embodiment, the viewfinder depth map includes depth information of a plurality of objects in the scene. In an example embodiment, the viewfinder depth map may be received by an apparatus, for example the apparatus 200, as a disparity histogram, for example the disparity histogram 330, as block averages, or as an edge map.

At 1004, the method 1000 includes facilitating selection of a first object, for example the lady 502 in FIG. 5A, and a second object, for example the lady 504 in FIG. 5A, from the plurality of objects based on depth information of the first object and the second object in the viewfinder depth map. In an example embodiment, the first object is associated with a first depth D1 and the second object is associated with a second depth D2 in the viewfinder depth map.

At 1006, the method 1000 includes determining a focus position of the camera to suitably focus the first object and the second object in one capture of the scene. In an example embodiment, the focus position is determined based on the first disparity (depth) D1 and the second disparity (depth) D2. In an example embodiment, the focus position may be determined by selecting a disparity (or depth) at a midpoint (see, line 506 in FIG. 5A) between the first disparity (depth) D1 and the second disparity (depth) D2. In another example embodiment, the focus position may be determined by selecting a disparity (depth) based on a weighted combination for the first disparity (depth) D1 and the second disparity (depth) D2. The focus position of the camera may be determined as described with reference to FIG. 5A.

At 1008, the method 1000 includes capturing an image based on adjusting the focus of the camera at the determined focus position. The capturing of the image is as described with reference to FIG. 5B.

At 1010, the method 1000 includes checking if sharpness of the first object and the second object is below a threshold sharpness in the captured image. If the sharpness is above the threshold sharpness, the method 1000 goes to block 1012 else 1014 is performed. At 1012, the captured image may be determined as a final image, as the sharpness of the first object and the second object is above the threshold sharpness in the captured image.

At 1014, the method 1000 includes checking if depth of field may be increased by decreasing a mechanical aperture of the camera. If the depth of field is not increased by decreasing the mechanical aperture, the method 1000 goes to block 1016 and performs operations at blocks 1016 and 1018, else 1020 is performed. At 1016, the method 1000 includes capturing a first image and a second image. In an example, the first image is captured by setting the focus of the camera at a first focus position corresponding to depth information of the first object, and the second image is captured by setting the focus of the camera at a second focus position corresponding to depth information of the second object. At 1018, the method 1000 includes combining the first image and the second image to generate the image. At 1020, the method 1000 includes decreasing the mechanical aperture of the camera to increase the depth of field and subsequently facilitate capture of the image. The capture of the image in different embodiment is as described with reference to FIGS. 5A-5B.

Figure 11:
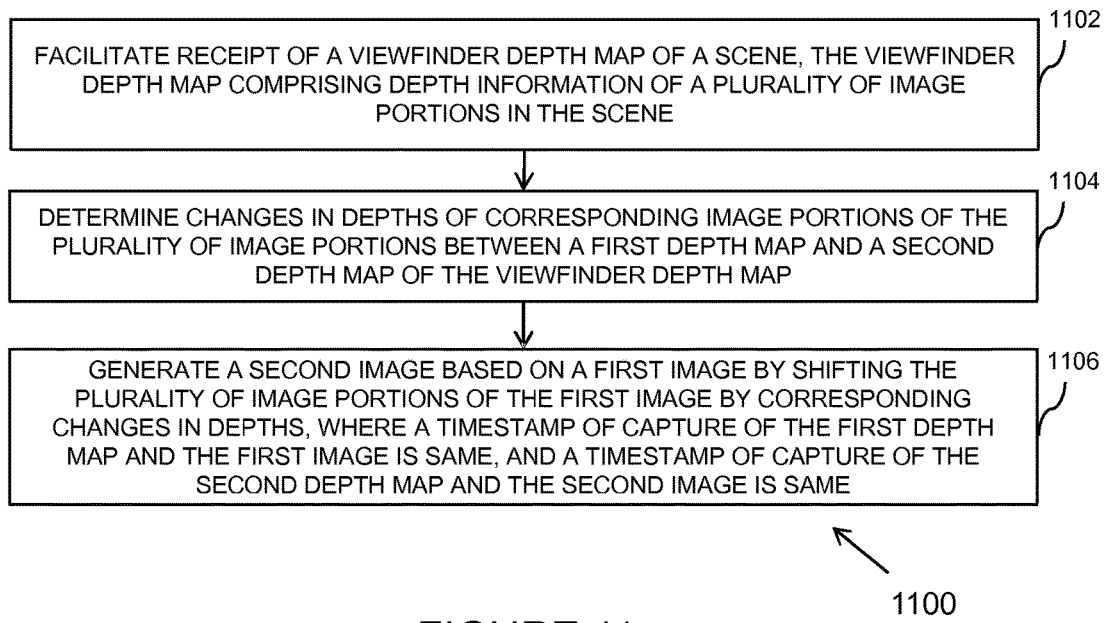
FIG. 11 is a flowchart depicting an example method for improving video capture, in accordance with another example embodiment.

FIG. 11 is a flowchart depicting an example method for improving video capture, in accordance with an example embodiment. The method 1100 is shown and explained with reference to FIG. 2. The method 1100 depicted in the flowchart may be executed by, for example, the apparatus 200 of FIG. 2.

At 1102, the method 1100 includes facilitating receipt of a viewfinder depth map of a scene as a disparity histogram. In an example embodiment, the viewfinder depth map includes depth information of a plurality of image portions in the scene. In an example embodiment, the image portions include a pixel or a patch of pixels. In an example embodiment, the viewfinder depth map may be received by an apparatus, for example the apparatus 200, as a disparity histogram, for example the disparity histogram 330, by way of block averages or as an edge map.

At 1104, the method 1100 includes determining changes in depths of corresponding image portions of the plurality of image portions between a first depth map and a second depth map of the viewfinder depth map. In an example embodiment, such changes in depth may be used to find pixel correspondences between the first depth map and the second depth map, and is described with reference to FIG. 6.

At 1106, the method 1100 includes generating a second image based on a first image by shifting the plurality of image portions of the first image by corresponding changes in depths. In an example embodiment, pixel correspondences are determined between the first depth map and the second depth map, and the second image is generated by shifting the plurality of image portions of the first image based on the determined pixel correspondences. In an example embodiment, a timestamp of capture of the first depth map and the first image is same, and a timestamp of capture of the second depth map and the second image is same.

In an example embodiment, the changes in depths can be determined by estimating optical flow among the first depth map, the second depth map and/or the first image. As described with reference to FIGS. 2 and 6, by upsampling the video, the second image (an additional image) can be generated, where the timestamp of the second image is same as the second depth map.

In another example embodiment, the second image may be generated based on a backward prediction or a weighted combination of both the backward prediction and the forward prediction. For the backward prediction, changes in depths of corresponding image portions of the plurality of image portions is determined between a third depth map and the second depth map of the viewfinder depth map. For the combination of both the backward prediction and the forward prediction, the changes in depth of corresponding image portions of the plurality of image portions is determined between the first depth map, the third depth map and the second depth map. In an example embodiment, a timestamp of capture of the third depth map and the third image is same, and the third depth map is captured chronologically later than the first and second depth maps. Such processes of increasing the video frame rate are described in detail with reference to FIG. 6.

It should be noted that to facilitate discussions of the flowcharts of FIGS. 7 to 11, certain operations are described herein as constituting distinct steps performed in a certain order. Such implementations are examples only and non-limiting in scope. Certain operation may be grouped together and performed in a single operation, and certain operations may be performed in an order that differs from the order employed in the examples set forth herein. Moreover, certain operations of the methods 700, 800, 900, 1000, and 1100 are performed in an automated fashion. These operations involve substantially no interaction with the user.

Other operations of the methods 700, 800, 900, 1000, and 1100 may be performed by in a manual fashion or semi-automatic fashion. These operations involve interaction with the user via one or more user interface presentations.

The methods depicted in these flowcharts may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus, provide operations for implementing the operations in the flowchart. The operations of the methods are described with help of apparatus 200. However, the operations of the methods may be described and/or practiced by using any other apparatus.

Without in any way limiting the scope, interpretation, or application of the claims appearing below, a technical effect of one or more of the example embodiments disclosed herein is to improve image and video capture in an apparatus. Various example embodiments provision for availability of viewfinder depth maps to improve imaging and video experience. Various example embodiments provision for efficient, fast, and accurate capture of images, thereby enabling accurate focus for both images (for example, in focal stack capture and weighted focusing) and videos (for example, in continuous autofocus and increasing video frame rate).

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

The invention claimed is:

1. A method comprising:
   facilitating receipt of a viewfinder depth map of a scene, the viewfinder depth map comprising depth information of a plurality of objects in the scene;
   facilitating selection of one or more objects from the plurality of objects based on depth information of the one or more objects in the viewfinder depth map; and
   facilitating capture of two or more images of the scene by at least adjusting focus of a camera corresponding to the depth information of the one or more objects that are selected, wherein the two or more images form a video, and wherein facilitating capture of the two or more images further comprises performing continuous autofocus of the one or more objects in the two or more images, and wherein performing the continuous autofocus comprises:
      determining a change in depths of the one or more objects between a first depth map and a second depth map of the viewfinder depth map, wherein the second depth map is received chronologically later than the first depth map;
      determining, with respect to a first focus position associated with a first image of the two or more images, a second focus position for capturing a second image of the two or more images by determining a change in a focus position of the camera with respect to the first focus position, the change in the focus position determined based on the change in depths of the one or more objects; and
      adjusting the focus of the camera based on the second focus position to capture the second image of the two or more images, wherein a viewfinder frame rate of receipt of the viewfinder depth map is greater than a video frame rate of capture of the two or more images and the second depth map is received prior to a time of capture of the second image of the two or more images.

2. The method as claimed in claim 1, wherein facilitating capture of the two or more images further comprises:
   capturing the two or more images by adjusting the focus of the camera, wherein an individual image of the two or more images is captured by setting the focus of the camera at a respective focus position corresponding to depth information of an individual object of the one or more objects.

3. The method as claimed in claim 1, further comprising combining the two or more images to generate an image.

4. The method as claimed in claim 1, wherein adjusting the focus of the camera comprises not setting the focus of the camera at all available focus positions.

5. The method as claimed in claim 1, wherein adjusting the focus of the camera comprises using statistics of the viewfinder depth map to augment a plurality of statistics generated by a statistics engine.

6. An apparatus comprising:
at least one processor; and
at least one memory comprising computer program code, the at least one memory and the computer program code configured to, with the at least one processor, cause the apparatus to at least perform:
facilitate receipt of a viewfinder depth map of a scene, the viewfinder depth map comprising depth information of a plurality of objects in the scene;
facilitate selection of one or more objects from the plurality of objects based on depth information of the one or more objects in the viewfinder depth map; and
facilitate capture of two or more images of the scene by at least adjusting focus of a camera corresponding to the depth information of the one or more objects that are selected, wherein the two or more images form a video, and wherein for facilitating capture of the two or more images, the apparatus is further caused, at least in part to perform continuous autofocus of the one or more objects in the two or more images, and wherein for performing the continuous autofocus, the apparatus is further caused, at least in part to:
determining a change in depths of the one or more objects between a first depth map and a second depth map of the viewfinder depth map, wherein the second depth map is received chronologically later than the first depth map;
determining, with respect to a first focus position associated with a first image of the two or more images, a second focus position for capturing a second image of the two or more images by determining a change in a focus position of the camera with respect to the first focus position, the change in the focus position determined based on the change in depths of the one or more objects; and
adjusting the focus of the camera based on the second focus position to capture the second image of the two or more images, wherein a viewfinder frame rate of receipt of the viewfinder depth map is greater than a video frame rate of capture of the two or more images and the second depth map is received prior to a time of capture of the second image of the two or more images.

7. The apparatus as claimed in claim 6, wherein for facilitating capture of the two or more images, the apparatus is further caused, at least in part to:
capture the two or more images by adjusting the focus of the camera, wherein an individual image of the two or more images is captured by setting the focus of the camera at a respective focus position corresponding to depth information of an individual object of the one or more objects.

8. The apparatus as claimed in claim 6, wherein the apparatus is further caused, at least in part to combine the two or more images to generate an image.

9. The apparatus as claimed in claim 6, wherein for adjusting the focus of the camera, the apparatus is further caused, at least in part to not set the focus of the camera at all available focus positions.

10. The apparatus as claimed in claim 9, wherein for adjusting the focus of the camera, the apparatus is further caused, at least in part to use statistics of the viewfinder depth map to augment a plurality of statistics generated by a statistics engine.

11. A computer program product comprising at least one non-transitory computer-readable storage medium, the non-transitory computer-readable storage medium comprising a set of instructions, which, when executed by one or more processors, cause an apparatus to at least perform:
facilitate receipt of a viewfinder depth map of a scene, the viewfinder depth map comprising depth information of a plurality of objects in the scene;
facilitate selection of two or more objects from the plurality of objects based on depth information of the two or more objects in the viewfinder depth map; and
facilitate capture of an image of the scene by at least adjusting focus of a camera corresponding to the depth information of the two or more objects that are selected, wherein the two or more images form a video, and wherein for facilitating capture of the two or more images, the apparatus is further caused, at least in part to perform continuous autofocus of the one or more objects in the two or more images, and wherein to perform the continuous autofocus, the apparatus is further caused to:
determine a change in depths of the one or more objects between a first depth map and a second depth map of the viewfinder depth map, wherein the second depth map is received chronologically later than the first depth map;
determine, with respect to a first focus position associated with a first image of the two or more images, a second focus position for capturing a second image of the two or more images by determining a change in a focus position of the camera with respect to the first focus position, the change in the focus position determined based on the change in depths of the one or more objects; and
adjust the focus of the camera based on the second focus position to capture the second image of the two or more images, wherein a viewfinder frame rate of receipt of the viewfinder depth map is greater than a video frame rate of capture of the two or more images and the second depth map is received prior to a time of capture of the second image of the two or more images.

12. The computer program product as claimed in 11, wherein for facilitating capture of the two or more images, the apparatus is further caused, at least in part to:
capture the two or more images by adjusting the focus of the camera, wherein an individual image of the two or more images is captured by setting the focus of the camera at a respective focus position corresponding to depth information of an individual object of the one or more objects.

13. The computer program product as claimed in 11, wherein the apparatus is further caused, at least in part to combine the two or more images to generate an image.

14. The computer program product as claimed in 11, wherein for adjusting the focus of the camera, the apparatus is further caused, at least in part to not set the focus of the camera at all available focus positions.

15. The computer program product as claimed in 14, wherein for adjusting the focus of the camera, the apparatus is further caused, at least in part to use statistics of the viewfinder depth map to augment a plurality of statistics generated by a statistics engine.

\* \* \* \* \*